(12) United States Patent
Hunt et al.

(10) Patent No.: US 6,488,209 B1
(45) Date of Patent: Dec. 3, 2002

(54) AUTOMATIC DATA COLLECTION DEVICE THAT DYNAMICALLY WEDGES DATA TRANSMITTED TO DATA CONSUMERS

(75) Inventors: Jeffrey M. Hunt, Everett, WA (US); Kenneth Y. Ogami, Bothell, WA (US); Jon R. Ramberg, Lynnwood, WA (US); James T. Katsandres, Seattle, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/240,425

(22) Filed: Jan. 29, 1999

(51) Int. Cl.[7] .................................................. G06K 7/10
(52) U.S. Cl. ............................ 235/462.15; 235/462.25
(58) Field of Search ....................... 235/462.07, 462.25, 235/462.15

(56) References Cited

U.S. PATENT DOCUMENTS

| | | | |
|---|---|---|---|
| 4,801,786 A | 1/1989 | Stobbe ........................ 235/377 |
| 4,825,058 A | 4/1989 | Poland ........................ 235/472 |
| 5,034,598 A | 7/1991 | Poland ........................ 235/435 |
| 5,052,020 A | 9/1991 | Koenck et al. ............... 375/62 |
| 5,070,536 A | 12/1991 | Mahany et al. ............... 455/67 |
| 5,121,342 A | 6/1992 | Szymborski et al. ........ 364/514 |
| 5,218,188 A | 6/1993 | Hanson ....................... 235/375 |
| 5,258,604 A | * 11/1993 | Behrens et al. |
| 5,261,079 A | 11/1993 | Celi, Jr. ........................ 395/500 |
| 5,295,154 A | 3/1994 | Meier et al. ..................... 375/1 |
| 5,309,351 A | 5/1994 | McCain et al. .............. 364/132 |
| 5,322,991 A | 6/1994 | Hanson ....................... 235/472 |
| 5,349,678 A | 9/1994 | Morris et al. ................ 395/800 |
| 5,365,546 A | 11/1994 | Koenck et al. ................ 375/9 |
| 5,404,493 A | 4/1995 | Bolme et al. ................ 395/500 |
| 5,418,684 A | 5/1995 | Koenck et al. .............. 361/680 |
| 5,425,051 A | 6/1995 | Mahany ....................... 375/202 |
| 5,440,564 A | 8/1995 | Ovada et al. ................ 370/112 |
| 5,471,596 A | 11/1995 | Brown, III ................... 395/375 |
| 5,572,512 A | 11/1996 | Cutler, Jr. et al. ............. 370/13 |
| 5,577,229 A | 11/1996 | Wakerly ....................... 395/474 |
| 5,586,281 A | 12/1996 | Miyama et al. ............. 395/405 |
| 5,604,516 A | 2/1997 | Herrod et al. ............... 345/168 |
| 5,623,603 A | 4/1997 | Jiang et al. ............. 395/200.04 |
| 5,875,415 A | * 2/1999 | Lieb et al. ................... 702/122 |
| 5,928,292 A | * 7/1999 | Miller et al. ................. 455/575 |

OTHER PUBLICATIONS

Palmer, Roger C. "Reading, Printing and Specification of Bar Code Symbols," *The Bar Code Book*, 2nd ed., Helmers Publishing, Inc., Peterborough, New Hampshire, 1991, p. 107.

* cited by examiner

*Primary Examiner*—Mark Tremblay
(74) *Attorney, Agent, or Firm*—Seed Intellectual Property Law Group PLLC

(57) ABSTRACT

A method and system for dynamically wedging data received from one or more automatic data collection ("ADC") devices on an ADC device platform into a destination application based upon wedging criteria. A dynamic wedge receives data from one or more ADC devices and automatically wedges the data into applications based upon user-provided data characteristics or a predetermined set of rules. Applicable wedging criteria used to route data include those that are user-composed and those that pertain to firmware or software characteristics. The dynamic wedge may comprise an ADC data server, ADC device handlers, ADC protocol handlers, and a wedging grid for retaining wedging directives. The ADC data server receives wedging directives from local and remote client applications and stores the wedging directives in the wedging grid. When data arrives from an ADC device, the ADC data server analyzes the data to determine its characteristics. The ADC data server compares the identified characteristics against the wedging directives stored in the wedging grid. The ADC data server then determines for which clients a match has been found. For those clients for which a match has been found, the ADC data server then performs the wedging directive in order to dispose properly of the received ADC data.

45 Claims, 9 Drawing Sheets

AUTOMATIC DATA COLLECTION DEVICE THAT DYNAMICALLY WEDGES DATA TRANSMITTED TO DATA CONSUMERS

TECHNICAL FIELD

The invention relates generally to automatic data collection ("ADC") devices and more particularly to transmitting data received from ADC devices.

BACKGROUND OF THE INVENTION

Automatic Data Collection ("ADC") device platforms, such as ADC device platforms equipped with bar code readers, have received increasing commercial attention in the past few years. ADC device platforms, such as hand-held data collection terminals, or hand-held personal computers, have been widely implemented in the retail marketplace and have garnered increasing utilization in a diverse range of application areas. The ever-decreasing cost and size of ADC device platforms has facilitated their entry into a wide variety of commercial, institutional, and governmental settings.

An ADC device platform having a bar code reader adeptly accesses and retrieves data stored in the form of a bar code label. Data representing virtually any product or service found in the stream of commerce may be encoded in a bar code label for later access by an ADC device platform having a bar code reader. Bar code readers include laser scanners as well as other means of collecting product information, such as a bar code wand, a still camera or an area imager. In addition to bar code labels, other ADC data formats include Radio Frequency ("RF") tags, resonators, SmartCards, magnetic strips, Optical Character Recognition ("OCR"), speech input, two-dimensional ("2D") symbols, dipole devices (such as those recited in U.S. Pat. No. 5,581,257), and any symbol having encoded data therein.

In a conventional ADC device platform environment, the recipient of ADC data either physically manipulates the ADC device platform itself to retrieve the ADC data or receives the ADC data through a local, and probably proprietary, network. Thus, a typical ADC device operator is limited both in terms of the distance from which the operator may be located away from the actual device and by the complexity and versatility of the elements that comprise the ADC device network which the operator utilizes. The operator suffers from still further limitations due to the fact that many conventional ADC device platforms are not readily configurable for new ADC devices, or even for ADC devices other than those attached to the ADC device platform when it is initially sold. Yet another limitation in a conventional ADC device platform arises when an operator wishes to add a new ADC device to one of the few ADC device platforms that will accept new ADC devices. This limitation stems from the fact that many ADC devices require proprietary communications protocols, and even when the communications protocols are non-proprietary, the communications protocols are typically non-standard. Thus, the operator cannot simply attach a new ADC device to an existing ADC device platform and expect that the new combination will function properly. Finally, the above limitations, both separately and together, hinder an ADC operator's ability to customize the ADC device platform to operate in the most productive manner possible.

Input data received by an ADC device platform must be routed to the intended destination. Conventional ADC device platforms typically have a simple connection that routes one type of data from a single ADC device to a single destination, typically an application program. However, ADC device consumers presently demand more sophisticated ADC device platforms that receive data from multiple ADC devices and route the data, of multiple types, to multiple destinations. While data routing decisions may be permanently fixed in an ADC device platform's basic design, such an approach provides only minimal flexibility and does not accommodate the addition of new ADC devices and new data recipients. Moreover, such an approach also prevents existing data recipients from reconfiguring their data routing instructions. ADC device consumers would like to register their specific data requests with an ADC device platform, including the specification of logical relationships and various contingencies with regard to the routing of ADC data. Finally, ADC data consumers expect that their data processing applications will operate upon data received from ADC devices regardless of whether the application recognizes specific ADC data types.

SUMMARY OF THE INVENTION

The invention provides a method and system for dynamically wedging data received from one or more automatic data collection ("ADC") devices on an ADC device platform into a destination application based upon wedging criteria. Applicable criteria for routing data may be user-composed and may pertain to firmware or software characteristics.

An ADC computing system having a dynamic wedge capability receives data from one or more ADC devices and automatically routes the data to applications based upon previously stored dynamic wedge directives, according to an aspect of the invention. Aspects of the ADC computing system having a dynamic wedge capability provide an efficient mechanism for channeling ADC data from one or more ADC devices to one or more client applications with a high degree of flexibility and user control.

A dynamic wedge mechanism may comprise an ADC data server in the ADC computing system, ADC device handlers, ADC protocol handlers, and a dynamic wedging grid that retains wedging directives, according to an aspect of the invention. The ADC data server receives wedging directives from local and remote client applications and stores the wedging directives in the dynamic wedging grid. When data arrives from an ADC device, a device-specific ADC data handler and a device-specific ADC protocol handler transform the data into a format operable by the ADC data server. The ADC data server analyzes the data to determine its characteristics. The ADC data server compares the identified characteristics against the wedging directives stored in the dynamic wedging grid. The ADC data server determines for which client applications a match has been found. For those clients for which a match has been found, the ADC data server then processes the appropriate wedging directive in order to dispose properly of the received ADC data. Aspects of the dynamic wedge may route ADC data to an application, both local and remote, to a virtual wedge, to a data file, or to any location that a client application may direct the sending of data.

Aspects of the invention operate in multiple client environments in which a client may receive data from multiple ADC devices, and multiple clients may receive data from the same ADC device. Aspects of the invention are applicable for dynamically wedging data received from ADC devices such as bar code readers, resonator readers, voice recognition devices, RF tag readers, detachable keyboards, two-dimensional symbol readers, ASCII data devices, AIMI-ECI data devices, dipole device readers, and optical character ("OCR") devices. In addition, aspects of the invention accommodate the later addition of other ADC devices. Thus, the invention enables a user to reconfigure the ADC device platform for new data collection environments.

BRIEF DESCRIPTION OF THE DRAWINGS

An exemplary embodiment of the invention will be described below relative to the following figures. Note that similar elements and steps in the figures have the same reference number. For ease in identifying the discussion of any particular element, the most significant digit in a reference number refers to the figure number in which that element is first introduced (e.g., element 204 is first introduced and discussed with respect to FIG. 2).

DETAILED DESCRIPTION OF THE INVENTION

Figure 1:
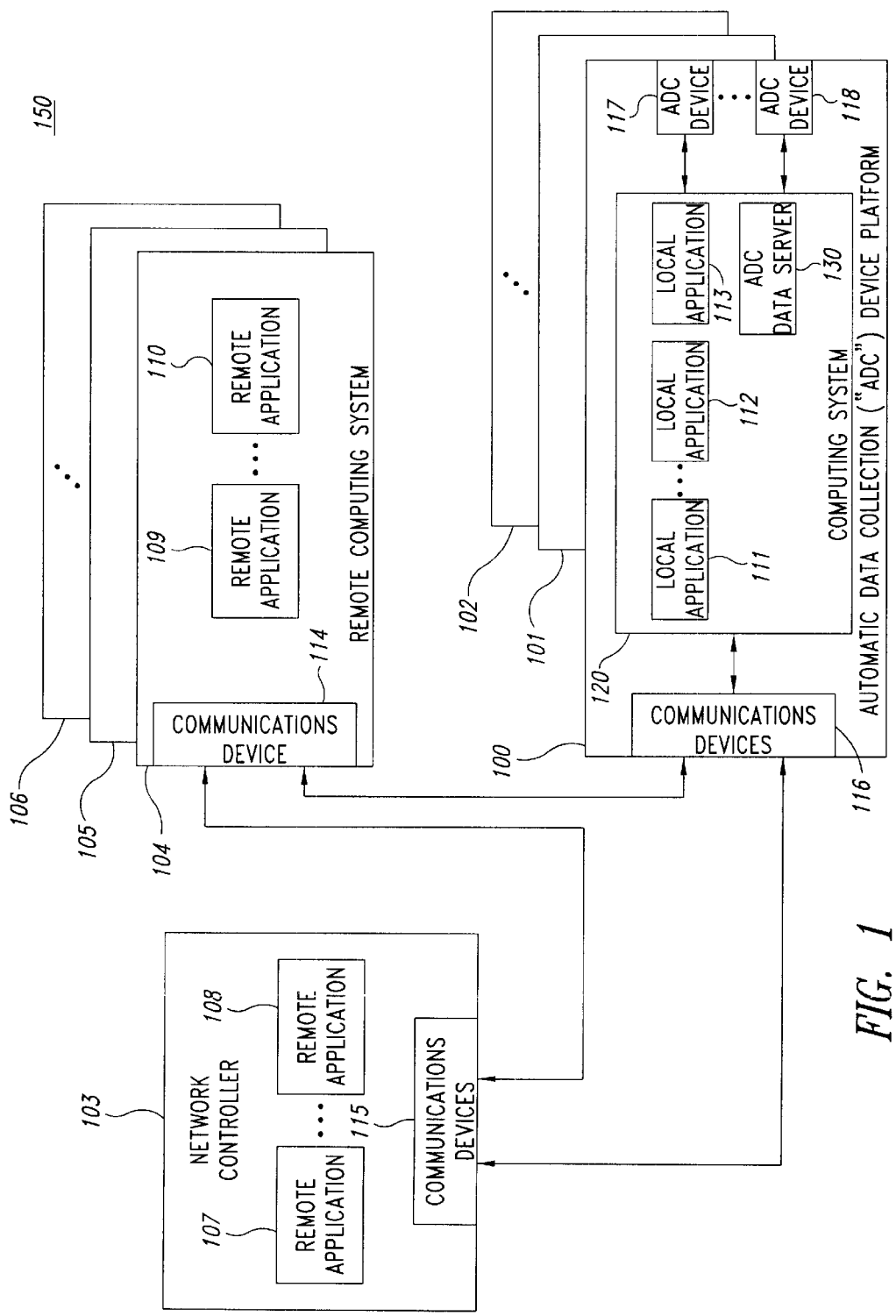
FIG. 1 depicts an ADC network 150 comprising a network controller 103, remote computing systems 104–106, and ADC device platforms 100–102 through which ADC data may be directed by one embodiment of the invention.

The invention provides a method and system for dynamically wedging data received from one or more automatic data collection ("ADC") devices in an ADC device platform and wedging the data into a client application based upon wedging criteria. Applicable criteria that may be used for routing data include those that are user entered and those generated by firmware or software. A dynamic wedge receives data from one or more ADC devices and automatically routes the data to applications based upon user-selected data characteristics or on a predetermined set of rules, according to one aspect of the invention.

The dynamic wedge provides an efficient mechanism for channeling ADC data from one or more ADC devices to one or more client applications with a high degree of flexibility and user control. The dynamic wedge provides user-accessible protocols so that the dynamic wedge may be easily configured to receive input from new ADC devices and to direct output to new clients. For example, the dynamic wedge may be configured to route the ADC data received from a bar code reader on the basis of bar code data characteristics such as bar code symbology, bar code size, bar code label quality, bar code label quantity, or combinations of these characteristics.

The dynamic wedge may comprise an ADC data server in a computing system on an ADC device platform, ADC device handlers, ADC protocol handlers, and a wedging grid for retaining wedging directives, according to one aspect of the invention. The ADC data server receives wedging directives from local and remote client applications and stores the wedging directives in the wedging grid. When data arrives from an ADC device, a device-specific ADC data handler and ADC protocol handler transform the data into a format suitable for operation by the ADC data server. The ADC data server then analyzes the data to determine its characteristics. The ADC data server next matches the identified characteristics with the wedging instructions stored in the wedging grid. The ADC data server then determines for which clients a match has been found. The ADC data server also determines the appropriate wedging directive in the wedging grid for each identified client and performs the wedging directive in order to dispose properly of the received ADC data.

Embodiments of the invention may operate in multiple client environments in which a client may receive data from multiple ADC devices, and multiple clients may receive data from the same ADC device. Embodiments of the invention may be applicable for dynamically wedging data received from ADC devices such as bar code readers, voice recognition devices, RF tag readers, resonator readers, detachable keyboards, two-dimensional symbol readers, dipole device readers, ASCII data devices, AIMI-ECI data devices, and optical character ("OCR") devices. AIMI-ECI ("extended channel interpretation") utilizes symbol value ranges (e.g., the range 00000 to 811,799) that represent particular classes of items (e.g., retail merchandise). In addition, aspects of the invention allow for the later addition of other ADC devices. Aspects of the invention also provide capabilities for receiving dynamic wedging directives from new clients and updating dynamic wedge directives from existing clients. Thus, the invention enables a user to reconfigure the ADC device platform for new data collection environments.

FIG. 1 depicts an ADC network 150 comprising a network controller 103, remote computing systems 104–106, and ADC device platforms 100–102 through which ADC data may be directed by one embodiment of the invention. The ADC network 150 may comprise additional remote computing systems, as indicated by the ellipsis between the remote computing system 105 and the remote computing system 106. The ADC network 150 may also comprise fewer than three remote computing systems in some embodiments. In addition, the ADC network 150 may comprise additional ADC device platforms, as indicated by the ellipsis between the ADC device platform 101 and the ADC device platform 102. The ADC network 150 may also comprise fewer than three ADC device platforms in some embodiments.

Using the ADC network 150, a remote operator at the remote computing system 104, for example, may receive data from ADC devices on the ADC device platform 100, such as an ADC device 117, an ADC device 118, or from both the ADC devices 117, 118 concurrently. A local operator at an ADC device platform, such as the ADC device platform 100, may similarly receive data from the ADC devices 117, 118. The ADC network 150 also allows an operator to control characteristics of the ADC platform 100 and any configurable subsystems on the ADC device platform 100. An operator may perform file transfers, view files, provide firmware upgrades and review graphically-represented unit performance statistics using the ADC network 150. An operator may also view a map of all ADC device platforms 100–102 in the ADC network 150 and their current status.

The remote computing systems in the ADC network 150, such as the remote computing system 104, comprise a communications device 114, and remote applications 109, 110. The dynamic wedge may wedge data from ADC devices into applications such as the remote application 109. The ellipsis between the remote application 109 and the remote application 110 indicates that the remote computing system 104 may contain more than two remote applications. The remote computing system 104 may be a Windows95-equipped personal computer ("PC"), a UNIX workstation, an IBM host computer, a WindowsCE-equipped hand-held computer, or any computing system capable of performing the tasks described herein. The Microsoft Corporation produces the Windows95 and WindowsCE operating systems.

The remote application 109 on the remote computing system 104 may include a browsing capability that facilitates data communication with the ADC device platform 100 over the ADC network 150. The ADC device platform 104, for example, may have a uniform resource locator ("URL") that facilitates communication between the ADC device platform 104 and the remote application 109. The remote web browser may host Java applets that coordinate data transfer from an ADC device on the ADC device platform 100 to the remote computing system 104. The remote computing system 104 may receive the Java applets from a variety of sources, including the ADC device platform 100 itself. The remote application 109 may also communicate with the ADC device platform 100 using other communications methods.

The network controller 103 includes communications devices 115 and the remote applications 107–108. The ellipsis between the remote application 107 and the remote application 108 indicates that the network controller 103 may contain more than two remote applications. In addition, the network controller 103 may contain fewer than two remote applications in some embodiments. The network controller 103 further includes applications that configure and manage the ADC device platforms 100–102 and the elements comprising the ADC device platforms 100–102. The remote computing systems 104–106 also may configure the ADC device platforms 100–102, either directly or indirectly via the network controller 103. An exemplary system and method for managing and configuring ADC device platforms is described in a provisional patent application entitled "Automatic Data Collection Device Having A Network Communications Capability," U.S. Provisional Application No. 60/084,272, filed on May 4, 1998, and assigned to a common assignee.

An exemplary ADC device platform, such as the ADC device platform 100, includes communications devices 116, a computing system 120, and the ADC devices 117, 118. The ADC device platform 100 may comprise more than two ADC devices as indicated by the ellipsis between the ADC device 117 and the ADC device 118. The ADC devices 117, 118 may comprise, for example, bar code readers, radio frequency ("RF") tag readers, resonator readers, SmartCard readers, magnetic stripe readers, optical character recognition ("OCR") readers, two-dimensional symbol readers, dipole device readers, speech input recognizing devices, and all other forms of scanning or imaging devices. An exemplary RF tag reader suitable for use in the ADC device platform 100 is described in U.S. application Ser. No. 08/771,320, entitled, "Automatic Mode Detection and Conversion System for Printers and Tag Interrogators," filed on Apr. 27, 1998 and assigned to a common assignee. The ADC device 117 may be a different type of, or the same as, the ADC device 118.

The computing system 120 in the ADC device platform 100 may utilize any suitable operating system. In a preferred embodiment, the computing system utilizes a WindowsCE operating system. The computing system 120 includes local applications 111–113 and an ADC data server 130. The computing system 120 may include more than three local applications, as indicated by the ellipsis between the local application 111 and the local application 112. Embodiments of the computing system 120 may contain fewer than three local applications.

The ADC data server 130 performs tasks such as managing multiple local and network ADC applications and collecting, filtering, buffering, and distributing data from multiple ADC devices to multiple clients such as the local application 111 and the remote application 109. The ADC data server 130 provides device-independent logical connections between client applications, such as the local applications 111–113 and the remote applications 107–110, for data communication with the ADC devices 117, 118. At the request of client applications, the ADC data server 130 collects data from the ADC devices 117, 118 and distributes it to the clients while also allowing the clients to write instructions regarding the disposition of data received from the ADC devices 117, 118.

A remote client, such as the remote application 107, is an ADC client running on a computing system other than the computing system 120. If the computing system 120 uses the WindowsNT or Windows98 operating systems then "DCOM" may be used to communicate to the ADC data server 130, according to an embodiment of the invention. DCOM, or "Distributed Component Object Model," stipulates how software components, small, reusable programming elements, communicate over Windows-based networks and permits the distribution of different components for a single application across two or more networked computers, such as the computing system 120 and the remote computing system 104, such that distribution of the components is not apparent to the user.

If the computing system uses a non-Windows operating system, then a TCP/IP sockets interface will be used. Sockets provide an identifier for a particular service on a particular node of a network. The socket consists of a node address and a port number that identifies the service. The Transmission Control Protocol ("TCP"), governs the break up of data messages into packets to be sent via the Internet Protocol ("IP") and the reassembly and verification of the complete messages from packets received. The ADC data server 130 allows multiple clients, such as the remote application 109 and the local application 111, to access multiple ADC devices without burdening these client applications with an understanding of the low level ADC device protocols or how to share access to multiple ADC devices.

The ADC data server 130 operates in conjunction with ADC protocol handlers and ADC device handlers. ADC protocol handlers and ADC device handlers encapsulate ADC device management, so adding a new ADC device to the ADC device platform 100 does not require modifications to the ADC data server 130. The ADC data server 130 may also communicate with a reader command gateway to provide commands for the ADC devices. The ADC data server 130 further notifies ADC devices, such as the ADC devices 117 and 118, when their configuration has changed to support on-the-fly configuration changes. The local applications 111–113 and the remote applications 107–110 may send operational and configuration commands to the ADC devices 117, 118.

Figure 2:
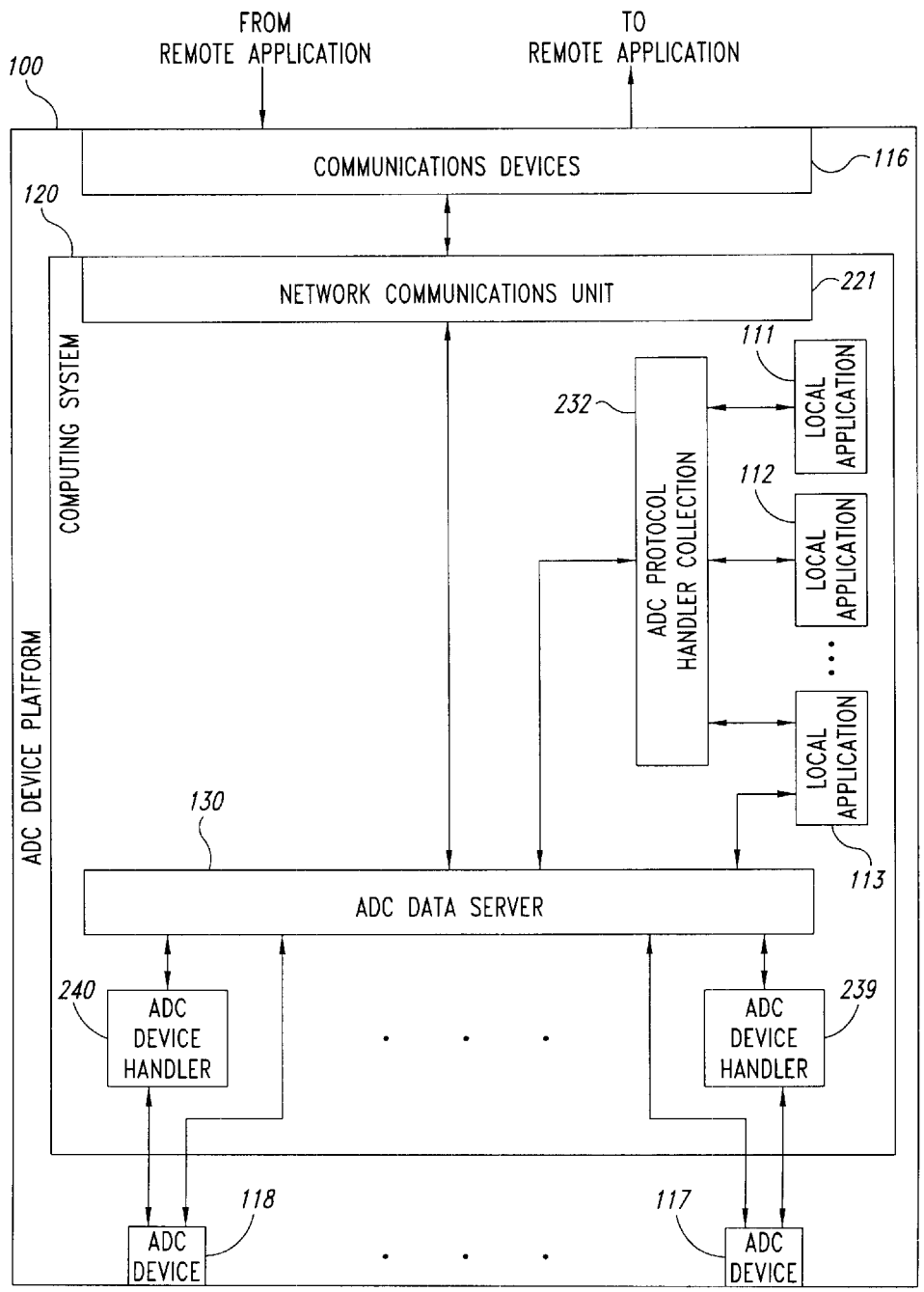
FIG. 2 provides a more detailed illustration of the computing system 120 in the ADC device platform 100, according to one exemplary embodiment of the invention.

FIG. 2 provides a more detailed illustration of the computing system 120 in the ADC device platform 100, according to an exemplary embodiment of the invention. The computing system 120 enables applications, such as the remote application 107 and the local application 111, to communicate with and access data from ADC devices, such as the ADC device 117. The computing system 120 further enables the dynamic wedging of data from ADC devices, such as the ADC device 117, to applications, such as the remote application 107 and the local application 111. The computing system 120 may comprise the ADC data server 130, an ADC protocol handler collection 232, ADC device handlers 239, 240, and a network communications unit 221, according to an embodiment of the invention.

The ADC data server 130 communicates with remote ADC clients, such as the remote application 109, through the network communications unit 221. In a preferred embodiment, remote ADC clients communicate with the ADC data server 130 using the Winsock 1.1 socket's interface over TCP/IP. Winsock is an application programming interface ("API"), that provides a TCP/IP socket interface in the Windows operating system. Embodiments of the network communications unit 221 may utilize a variety of communications methods in communicating with remote applications, including sockets, TCP/IP, UDP, and UDP+.

The User Datagram Protocol ("UDP") is a connectionless protocol parallel to TCP in the IP communication stack. UDP converts data messages generated by an application into packets to be sent via IP, but does not verify that the messages have been delivered correctly. Therefore, UDP is more efficient than TCP, although the reliability of UDP depends on the application generating the message. UDP+ provides additional functionality that is not provided by UDP, such as guaranteed packet delivery and packet ordering. The ADC data server 130 supports all physical communication methods provided by TCP/IP, UDP, and UDP+ such as serial communication and Infrared Data Association ("IRDA") standard communication. UDP+ is further described in U.S. application Ser. No. 08/852,002, entitled, "Reliable Communication over an Unreliable Transport Layer in a Hand-Held Device using User-Configurable Timers," filed on May 6, 1997 is also described in U.S. application Ser. No. 08/851,848, "Providing Reliable Communication over an Unreliable Transport Layer in a Hand-Held Device using a Persistent Session," both filed on May 6, 1997 and assigned to a common assignee.

After a successful connection with a client application, including both local and remote applications, the ADC data server 130 dedicates resources to handle all communications to the client application, ensuring that communication problems with one client will not affect other remote or local clients. In one embodiment, the communication scheme utilized between the remote applications, such as the remote application 109, and the ADC data server 130, provides a variable length, packet message format. A client, such as the remote application 109, performs a first read to determine the message length. The client next allocates a sufficiently large buffer to hold the response and performs a second read to retrieve the rest of the message.

If communication errors occur while the ADC data server 130 communicates with a client, such as the remote application 109, the ADC data server 130 tries to re-establish communication before closing the connection. After closing the connection, the ADC data server 130 maintains the client data and resources for a user-configurable time period so that the client may reconnect with the ADC data server 130. The reconnect time out period is configurable by users of the ADC device platform 100. After the reconnect time out period, the ADC data server 130 discards all data resources for the client. The ADC data server 130 uses a "no activity time out" to control client communications when the ADC data server 130 "pings" clients for which there has been no recent activity. For clients that fail to respond, the ADC data server 130 enters a communication "retry" mode similar to the connection error mode above.

The ADC device platform 100 maintains an ADC device handler 239–240 and an ADC protocol handler (in the protocol handler collection 232) for each ADC device, according to an embodiment of the invention. The ADC protocol handlers format messages for device-unique functions while the ADC device handlers format messages for device-common functions. The ADC device handler and ADC protocol handler pair hide device-specific protocols from the ADC clients, simplifying the addition of ADC devices to the ADC device platform 100. The ADC protocol handler collection 232 contains the ADC protocol handlers.

The ADC device handlers, such as the ADC device handler 239, accept commands from the ADC data server 130, translate them into commands for their respective ADC device, and send them to the ADC device using a serial channel or any other means for communicating with the ADC device such as short haul RF and parallel channel. The ADC data server 130 utilizes the ADC device handlers 239, 240 for communicating instructions to the ADC devices 117, 118, respectively. Each supported ADC device, such as the ADC device 118, has a corresponding ADC device handler, such as the ADC device handler 240 for the ADC device 118. Accordingly, if the ADC device platform 100 includes more than two ADC devices, then the computing system 120 will include more than two ADC device handlers. The ADC device handlers hide the specific access requirements for a respective ADC device from the ADC clients, such as the local application 111 and the remote application 109. The ADC device handlers are COM objects that provide a transport layer for sending data formatted by the corresponding ADC protocol handler in the ADC protocol handler collection 232 to the ADC device, according to an embodiment of the invention. COM objects, or "Component Object Model" objects, are software components that may be assembled into programs or add functionality to existing programs. COM objects may also be easily removed from programs. Of course, the invention does not require the use of COM objects. Dynamic link libraries ("DLLs") may also be used, as well as a number of other appropriate technologies.

The ADC protocol handlers in the ADC protocol handler collection is 232 provide APIs that allow applications to retrieve ADC data and control ADC devices, such as the ADC devices 117, 118. Each ADC protocol handler in the ADC protocol handler collection 232 is a COM object that supports an ADC device-specific interface to guarantee access to the interface for the ADC data server 130, according to an embodiment of the invention. The ADC device-specific interface operations include opening a client communications channel to a specific ADC device, such as the ADC device 117. For ADC devices that support client handles, the ADC device-specific interface issues a device request that causes the ADC device to return a client handle. A client handle is a numeric value used by the device to assign specific clients. A client handle is assigned to an application when the application first requests a communications channel with the device. A client is a single instance of an application that communicates with the deviceFor ADC devices that do not support handles, the corresponding ADC device handler itself may generate a handle, according to some embodiments of the invention.

To receive responses from an ADC device, the ADC data server 130 calls the appropriate ADC device handler. Responses provided by an ADC device handler from its corresponding ADC device may include additional information along with the response data to help match the response data to the request that generated the response data or to a client who should receive the data. For example, a read request may return a sequence number, a client handle, a data class specification, and a data set. The sequence number associates a particular read request with a specific response, e.g., the request includes a sequence number. The ADC device handler does not guarantee that the sequence number will be returned. For example, unsolicited responses produced by an ADC device may not have a sequence number, and some ADC devices do not support sequence numbers. The client handle associates input from an ADC device with a specific client. If the ADC device (or the ADC device handler) supports client handles, a client's read request will return the appropriate client handle. The data class specification indicates the data classes to which the response data belongs. The ADC data server 130 may store the data class specification along with the data for retrieval by the appropriate client(s).

When a data read returns a client device handle (and a zero for the sequence number), the ADC data server 130 routes the data to the client having the same client device handle. A client device handle of zero indicates that there is no handle for the response data. If both the sequence number and client device handle are non-zero, the sequence number takes precedence.

When the ADC device handler returns a sequence number of zero and a client device handle of zero, the ADC data server 130 performs grid processing to determine which client(s) should receive the data, according to an embodiment of the invention. First, the ADC data server 130 performs non-device specific grid processing to match one or more data masks with the data received from the ADC device. The ADC data server 130 next calls the appropriate ADC device handler's "match grid" function to perform device-specific grid processing. If both grids match, then the response is routed to the identified client.

The ADC data server 130 dynamically wedges data to one or more clients based upon the wedging directives stored in a wedge grid. The wedge grid operates as a data filter. The ADC data server 130 supports data filtering so that the data sent to ADC clients matches their requested wedging directives. The ADC data server 130 supports non-ADC device-specific grid criteria, such as a general user-selected request for data from any ADC device when the value range of the received data ranges from a high to a low value. The ADC device handlers support ADC device-specific grid criteria, such as a request for a particular data type for a particular ADC device. The wedge grid may be changed dynamically. The ADC wedge grid may comprise three components, according to an embodiment of the invention. The three components are one or more data classes, a device-independent grid data mask, and a device-dependent grid mask. A device-dependent mask is specific to the device type. For example, a device-dependent mask may exist for Code 39, which is a type of data that may be produced from an ADC device known as a bar code scanner. Non-device specific grid criteria may include a data value range (for example, the data values from 23 to 192 may be specified); a number of data elements, a range for the number of data elements (for example, bar-code labels containing from 6 to 9 characters may be specified) and a data class specification. The non-device specific grid criteria may be represented in a data mask, having a data pattern such as "###-##-####" where "#" represents a numeric value and "-" represents a dash literal. A literal is a value used in a program that is expressed as itself rather than as a variable's value or the result of an expression. The ADC data server 130 has found a match when an wedge grid directive matches received data. To perform grid matching, the ADC data server 130 first attempts to match one of the data classes and then tries to match the device-dependent grid and the device-independent grid, according to an embodiment of the invention. If all three conditions are satisfied, then the data response will be returned to the client. In other words, the grid specifications may be logically "ANDed" to determine whether the ADC data grid matches the received data.

Of course, each client application will typically complete the following sequence in order to read data: perform an Open(Device) operation, perform a series tasks such as Read(Data_Grid) and device control, concluding with a Close ( ) task when the client does not wish to access the ADC device anymore, according to an embodiment of the invention. The open/close operations are typically performed only once, while other device accesses may be performed multiple times by the client application.

The wedge grid may also contain a data class specification that identifies the data classes accepted for a client and the data classes specifically disallowed. A data class is a device-dependent classification of data responses from an ADC device. A data class is a classification of ADC device data so that data can be broadly grouped. For example, USER_INPUT may be one data class while READER_COMMAND may be another class of device data. The ADC device handler identifies an ADC device response with one or more data classes. Data classes can identify responses that come from device configuration requests, responses that come from user-entered data, and responses that come from ADC data server requests. The ADC protocol handler may change the data class specification. When the protocol handler sends a read request to an ADC device, the ADC protocol handler specifies one or more data classes requested to be read. The data class specification identifies the data classes that may be queued for the client and those that are specifically disallowed.

The dynamic wedge mechanism may also be used in conjunction with a mechanism for intelligently routing data based upon data type. A client's dynamic wedge directive may refer to the data type that the client has previously requested using the intelligent data routing mechanism. For example, a dynamic wedge directive may state "val(I-type) >120," instructing the dynamic wedging of data that matches the type stored for the client in the intelligent data routing mechanism (I-type) when the value of the data is greater than 120. This arrangement allows the client to change the data type in the intelligent routing mechanism, which may have other purposes, without having to change the dynamic wedging directive. An exemplary mechanism for intelligently routing data is described in U.S. application Ser. No. 09/240194, entitled "Automatic Data Collection Device That Intelligently Switches Data Based On Data Type" filed on Jan. 29, 1999 and assigned to a common assignee.

The ADC data server 130 supports read ahead and non-read ahead clients. For a read ahead client, the ADC data server 130 queues data until the client is ready to read it. Read ahead de-couples ADC device performance from an ADC client's communications system performance. For a non-read ahead client, the ADC data server 130 does not post a data read to an ADC device until the client posts a read to the ADC data server 130. However, if an ADC device sends data without a read posted, the ADC data server 130 accepts the data, buffers it, and returns it to the client on the next read.

The ADC data server 130 may further support read ahead clients by automatically posting a read to the ADC device on the client's behalf when the ADC data server 130 receives data from the ADC device. When its data queue is full, the ADC data server 130 notifies the appropriate ADC device handler that no more data can be read. The next read by the client returns the data, and the ADC data server 130 notifies the appropriate ADC device handler that data can again be read. The ADC data server 130 may support non-read ahead clients by canceling all outstanding read ahead requests and not issuing another read command until the client issues a read. This allows the non-read ahead client to pace the device operator in entering data. Only one non-read ahead client will be allowed at a time for a given ADC device since the non-read ahead client paces the performance of the ADC device, according to a preferred embodiment of the invention.

The ADC data server 130 also supports synchronous and asynchronous requests. For a synchronous request, the ADC data server 130 blocks the call until the request is complete or until the timeout expires. When a synchronous request is outstanding, the ADC data server 130 blocks all other requests except for a cancel request. For asynchronous requests, the ADC data server 130 returns the call immediately with or without data. Whenever data is received for asynchronous clients, the ADC data server 130 may signal an ADC client-supplied event.

The dynamic wedge receives data from various ADC devices and then automatically routes the data to clients based on user-selected data characteristics or on a predetermined set of rules. Applicable criteria that may be used for routing data include both those that are user-entered and those that are generated by firmware or software. As such, the dynamic wedge performs data routing in real time, as the data is being received, based on user-selectable routing decisions. Such routing decisions provide flexibility in routing the data in an efficient manner.

Figure 3:
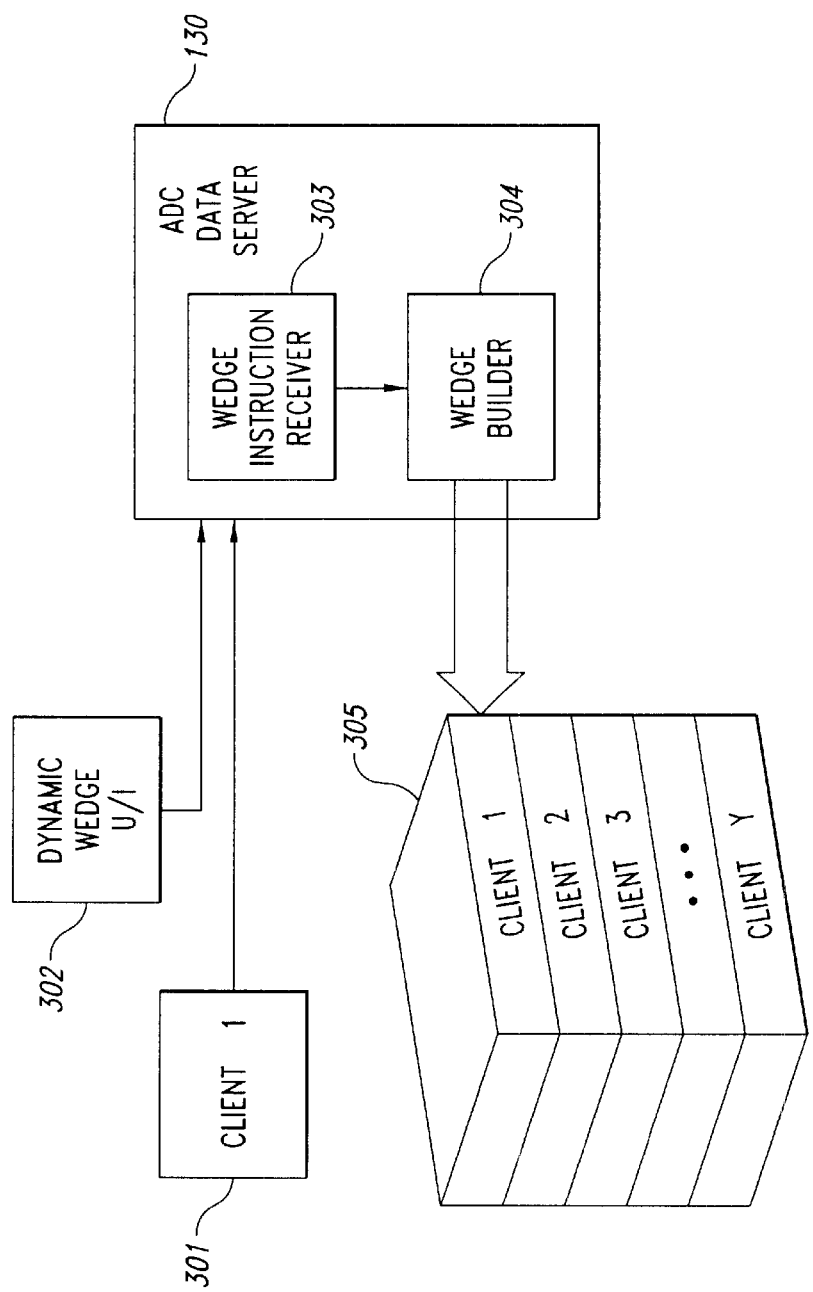
FIG. 3 provides a block diagram showing the processing of dynamic wedging directives, according to one embodiment of the invention.

FIG. 3 provides a block diagram showing the processing of dynamic wedging directives, according to an embodiment of the invention. A client 301 sends dynamic wedge directives to the ADC data server 130. A typical dynamic wedging directive differs from a normal client data request in that a dynamic wedging directive may include contingencies, and dynamic wedge criteria for a given client may be composed of numerous contingencies. A wedge instruction receiver 303 receives the dynamic wedging directives sent by the client 301. The wedge instruction receiver 303 identifies a source of the wedge directive (e.g., client 301) and sends the directive to a wedge builder 304.

The wedge builder 304 then sends the wedge directive to a wedge grid 305. The wedge builder 304 understands the structure of the wedge grid 305 and directs the storage of the wedge directive in the wedge grid 305. While the wedge grid 305 appears to have a uniform structure, the wedging directives may actually be stored in disparate locations throughout the ADC data platform 100, e.g., among various ADC device handlers. Once the wedge builder 304 has stored a dynamic wedge directive for the client 301 in the wedge grid 305, then the ADC data server 130 will follow this directive for data that may be directed to the client 301 from ADC devices associated with the ADC device platform 100.

Wedging directives may also be received from a dynamic wedge user interface 302. When the wedge instruction receiver 303 receives a dynamic wedge directive from the dynamic wedge user interface 302, the wedge instruction receiver 303 then determines whether the dynamic wedge directive received pertains to a specific client or to more than one client associated with the ADC device platform 100. The wedge instruction receiver 303 and the wedge builder 304 otherwise process dynamic wedging directives received from the dynamic wedge user interface 302 in the manner described above.

Figure 4:
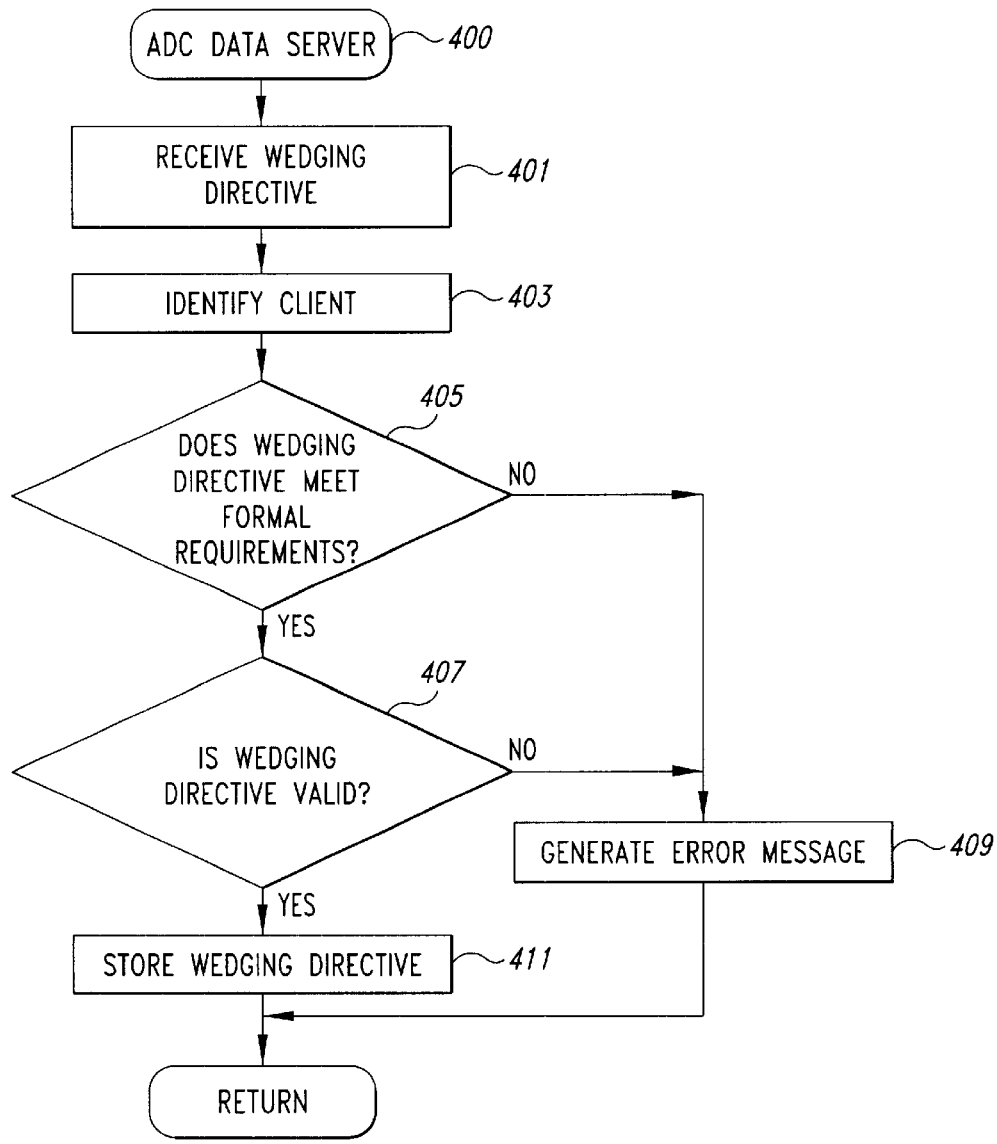
FIG. 4 is a flowchart illustrating the operations of the ADC data server 130 in processing dynamic wedge directives.

FIG. 4 is a flowchart illustrating the operations of the ADC data server 130 in processing dynamic wedge directives. As discussed above, the ADC data server 130 may contain a wedge instruction receiver 303 and a wedge builder 304 that facilitate the ADC data server's processing of dynamic wedge directives.

The ADC data server 130 receives dynamic wedge directives (step 401). The ADC data server 130 identifies the client(s) to which the dynamic wedge directive pertains (step 403). As previously discussed, the dynamic wedge directives may be sent by both a client and a dynamic wedge user interface.

The ADC data server 130 determines whether the wedge directive meets the formal requirements (step 405). The formal requirements refer merely to the structure of wedge directives. If the wedge directive does not meet the formal requirements (step 405), then in the ADC data server 130 generates an error message (step 409). If the wedge directive meets the formal requirements (step 405), then the ADC data server 130 determines whether the wedge directive is valid (step 407). The validity of a wedging directive refers to whether the ADC device platform 100 and its associated devices (e.g., the ADC device 117) are capable of performing such a request. If the wedge directive is not valid (step 407), then the ADC data server 130 generates an error message (step 409).

If the wedging directive is valid (step 407), then the ADC data server 130 stores the wedging directive in the dynamic wedge grid 305 (step 411). Once a wedge directive has been stored for a particular client in the dynamic wedge grid 305, then the ADC data server 130 will follow the wedging directive for ADC data arriving at the ADC data server 130 for subsequent transmission to the client.

Figure 5:
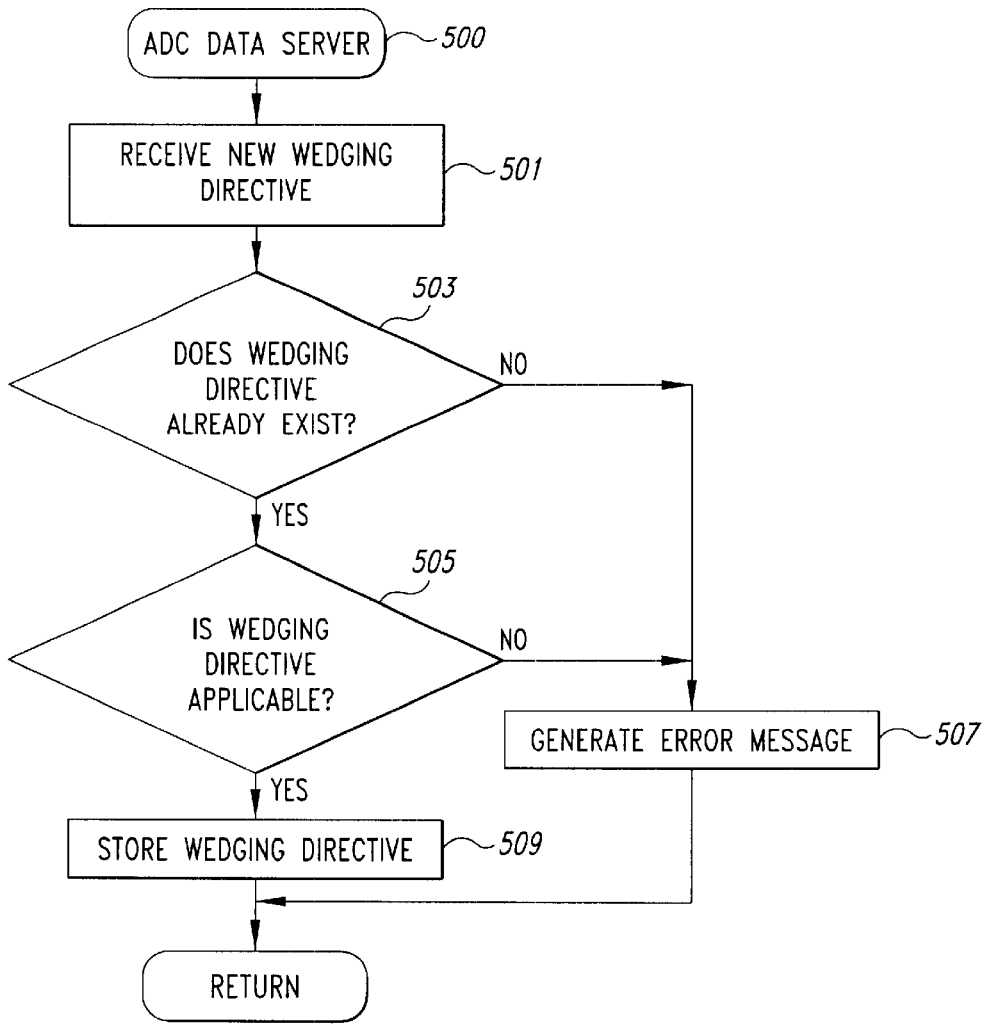
FIG. 5 is a flowchart illustrating the procedures followed by the ADC data server 130 in determining whether a wedging directive is valid, e.g., steps 407–411 of FIG. 4.

FIG. 5 is a flowchart illustrating the procedures followed by the ADC data server 130 in determining whether a wedging directive is valid, e.g., steps 407–411 of FIG. 4. The ADC data server 130 first examines the wedging directive to identify a new wedging condition specified in the wedging directive (step 501).

The ADC data server 130 determines whether the wedging directive already exists in the dynamic wedge grid 305 (step 503). Under step 503, the ADC data server 130 examines the wedging directive to determine the specific wedging directives it includes and then compares these wedging directives with wedging directives already stored in the dynamic wedge grid 305. If the wedging directive already exists (step 503), then the ADC data server generates an error message (step 507).

If the wedging directive does not already exist (step 503), then the ADC data server 130 determines whether the wedging directive is applicable for the specified client(s) and suitable for performance on the ADC device platform 100 and its associated devices (e.g., the ADC device 117) (step 505). If the wedging directive is not applicable (step 505), then the ADC data server 130 generates an error message (step 507).

If the wedging directive is applicable (step 505), then the ADC data server 130 directs the storage of the wedging directive in the dynamic wedge grid 305 (step 509). Once the ADC data server 130 has stored a wedging directive in the dynamic wedge grid 305, then the ADC data server 130 will follow the wedging directive for ADC data received by the ADC data server 130 for transmission to the applicable client.

Figure 6:
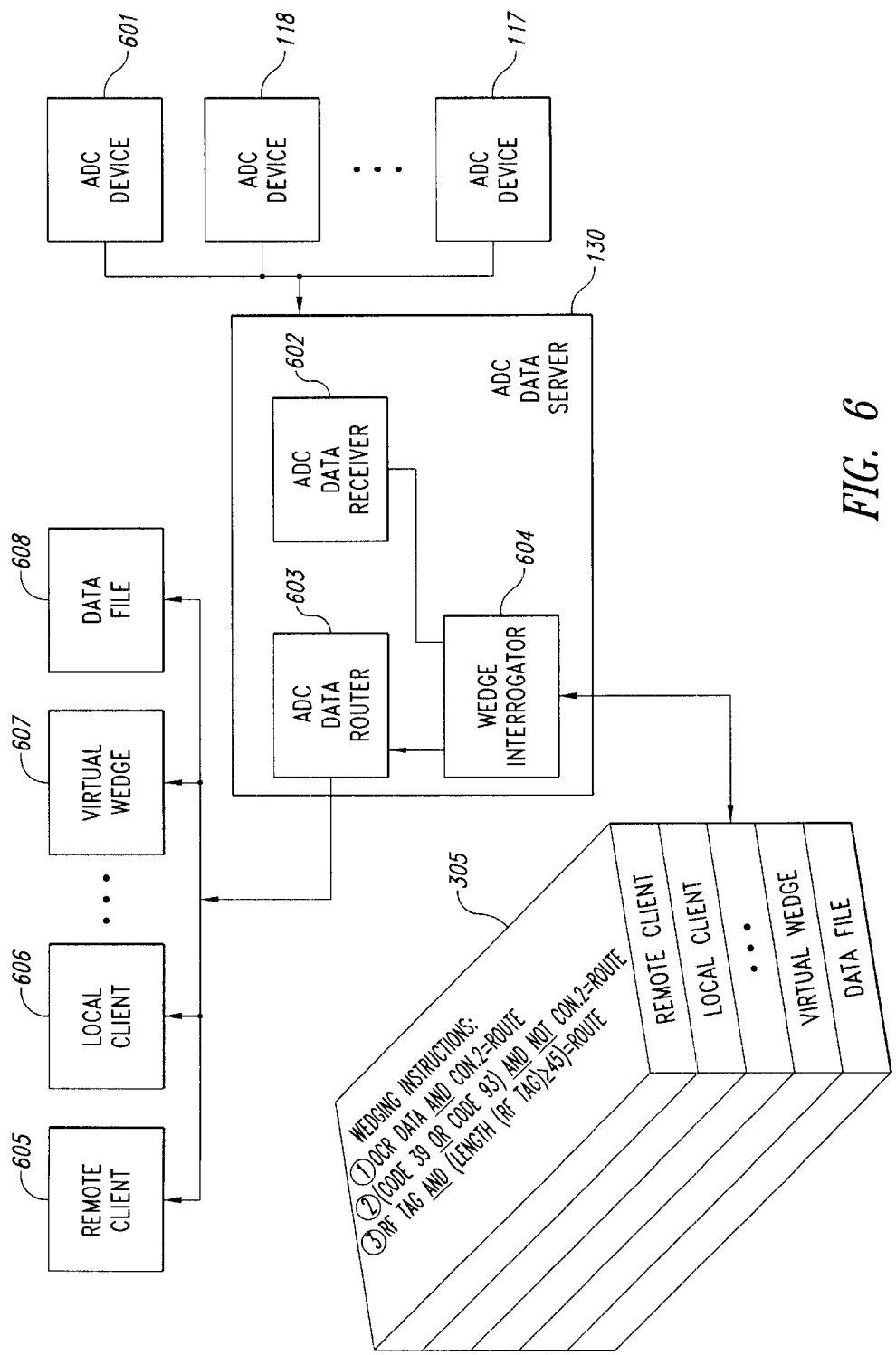
FIG. 6 provides a block diagram showing the ADC data server 130 performing dynamic wedging.

FIG. 6 provides a block diagram showing the ADC data server 130 performing dynamic wedging. The ADC data server 130 receives ADC data from ADC devices 117, 118, and 601 in this embodiment of the ADC device platform 100. As previously discussed, the ADC device platform 100 may have both more and fewer ADC devices. The ADC device server 130 transmits ADC data to a remote client 605, a local client 606, a virtual wedge 607, and a data file 608. As indicated by the ellipsis between the local client 606 and the virtual wedge 607, the ADC data server 130 may transmit ADC data to additional recipients. The remote client 605 may be a remote application, such as the remote application 107 shown in FIG. 1. The local client 606 may be a local application, such as the local application 111 shown in FIG. 1. The data file 608 may be used for backup storage of ADC data, as well as storage of ADC data before being read by another client.

One of the ADC devices sends data to the ADC data server 130. An ADC data receiver 602 in the ADC data server 130 receives the ADC data and passes it to a wedge interrogator 604 that examines the ADC data to determine its pertinent characteristics. For example, the pertinent characteristics may include a client handle and identification of a data length for the ADC data. The wedge interrogator 604 then examines the dynamic wedge grid 305 to determine the wedging directives, if any, that may pertain to the received ADC data. For example as shown in FIG. 6, for illustration purposes only, the remote client 605 has indicated three different wedging directives in the wedging grid 305. The wedge interrogator 604 examines the wedging directives for the remote client 605 to determine whether any of these wedging directives apply, assuming that the ADC data could be routed to the remote client 605 based on the previously identified data characteristics. The wedge interrogator 604 may perform multiple examinations of the wedging grid 305 and the characteristics of the ADC data. For example, the wedge interrogator 604 may perform an initial examination on the ADC data to determine certain general characteristics, and then based upon its initial examination of the dynamic wedge grid 305, may perform additional examination of the ADC data to determine additional characteristics that the wedge interrogator 604 then compares against the wedging directives in the dynamic wedge grid 305.

The dynamic wedge 604 next identifies the recipients (e.g., clients) for the received ADC data to an ADC data router 603. For example, the wedging interrogator 604 may determine that both the remote client 605 and the local client 606 have previously provided wedging directives indicating that ADC data of the type of ADC data received (e.g., having the identified characteristics) should be forwarded to them. Accordingly, the ADC data router 603 transmits the data to the remote client 605 and a local client 606.

The virtual wedge 607 retrieves data from the ADC devices 117, 118, and 601 and sends the data into a keyboard device driver that converts the data to keyboard data. Thus, an ADC device-unaware application, such as the local application 113 shown in FIG. 1, receives the ADC data as if it were keyboard input. An exemplary embodiment of the virtual wedge 607 is described in a U.S. Patent Application, entitled "Automatic Data Collection" ("ADC") Device That Includes A Virtual Wedge That Routes ADC Data To Application Programs," filed on Ser. No. 09/239,558, and assigned to a common assignee.

Figure 7:
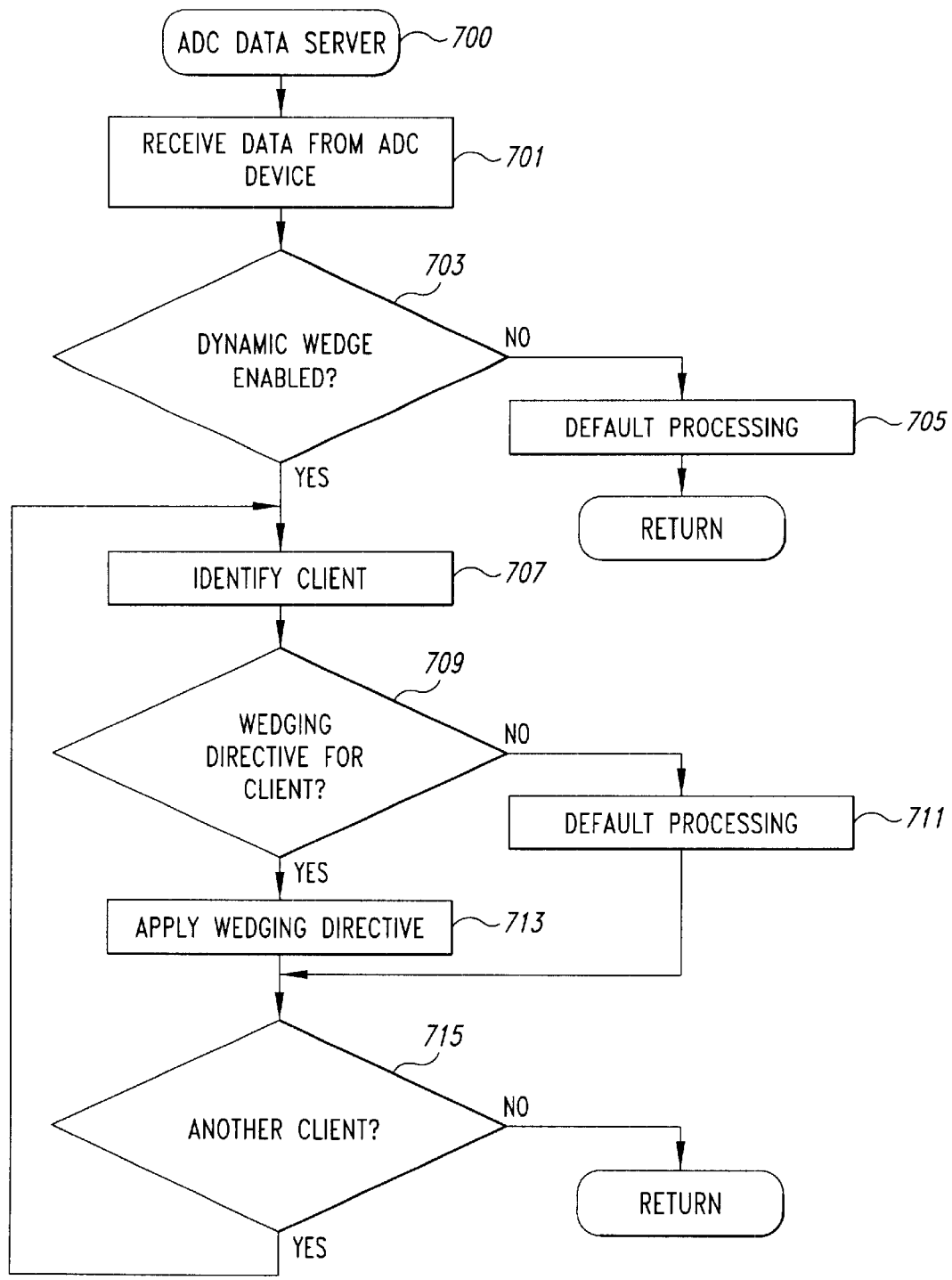
FIG. 7 is a flowchart illustrating the operations of the ADC data server 130 with regard to dynamically wedging ADC data.

FIG. 7 is a flowchart illustrating the operations of the ADC data server 130 with regard to dynamically wedging ADC data, according to an embodiment of the invention. The ADC data server 130 receives ADC data from an ADC device (step 701). The ADC data server 130 then determines whether dynamic wedging has been enabled (step 703). If dynamic wedging has not been enabled (step 703), then the ADC data server 130 performs default processing on the ADC data (step 705).

If dynamic wedging has been enabled (step 703), then the ADC data server 130 identifies the client or clients to which the ADC data has been directed (step 707). The ADC data server 130 next determines whether a wedging directive has been received for the identified client (step 709). If a wedging directive has not been previously received for the identified client (step 709), then the ADC data server 130 performs default processing on the ADC data (step 711). If a wedging directive has been previously received for the identified client (step 709), the ADC data server 130 applies the wedging directive (step 713).

The ADC data server 130 then determines whether the ADC data should be transmitted to other clients, as previously discussed (step 715). Once the ADC data server 130 has identified all of the clients to receive the ADC data, then the ADC data server 130 transmits the ADC data to the clients.

Figure 8:
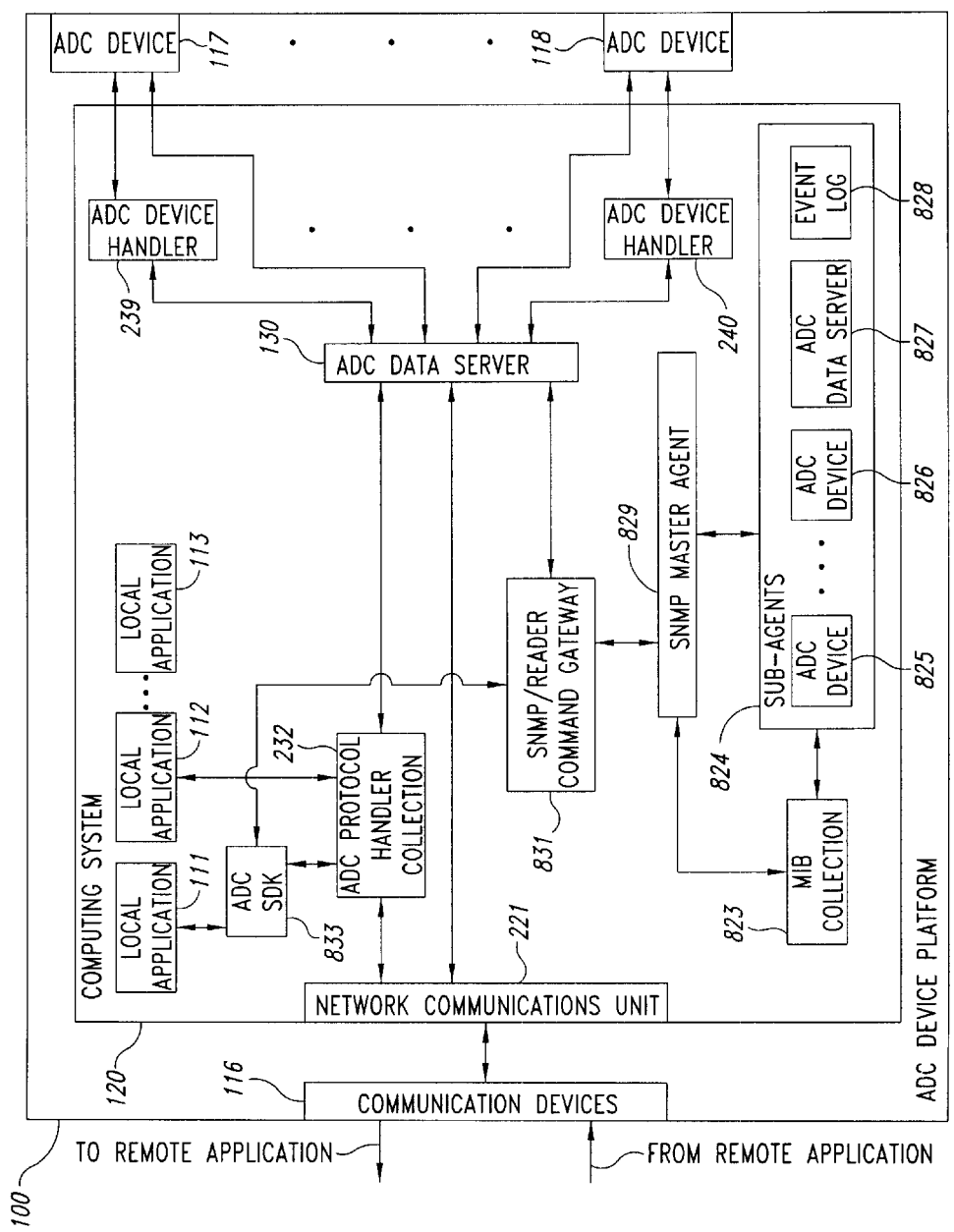
FIG. 8 illustrates an alternate embodiment of the ADC computing system 120.

FIG. 8 illustrates an alternate embodiment of the ADC computing system 120. The ADC computing system 120 further comprises an SNMP/Reader Command Gateway 831, an SNMP master agent 829, a management information base ("MIB") collection 823, an SNMP subagent collection 834, and an ADC software development kit ("SDK") 833, all described below.

The ADC data server 130 uses shared memory and process synchronization objects to perform inter-process communication ("IPC"). The IPC mechanisms are hidden within the ADC data server's API, and the ADC device handlers. The ADC data server API provides an ADC device-ADC data server interface. The ADC device-ADC data server interface hides the IPC mechanism from the ADC data server process. The ADC device-ADC data server interface initializes and deletes an ADC data server API COM object for an ADC device and opens and closes a logical communications channel with an ADC device, such as the ADC device 117. The ADC data server 130 determines the default channel attributes.

The ADC device-ADC data server interface may request data from the ADC data server 130. This operation produces a "data class mask" that identifies the class of data to be sent to a particular client as previously discussed with regard to FIG. 2. The data class masks may be device dependent or device independent. The ADC data server 130 only returns data from the mask(s) identified. The ADC device-ADC data server interface sends control data to the ADC device without interpretation by the ADC data server 130. The ADC device-ADC data server interface may also perform a "query attribute" function that returns a specific device attribute or specific client handle attribute. Device attributes include the device's enablement status. Handle attributes include in the device-dependent grid, the device-independent grid, read ahead status, and the data class read specification. The ADC device-ADC data server interface performs alterations of specific ADC device attributes. The ADC device-ADC data server interface includes a "query data" function that returns the number of data items stored for a client and the size of the next data item. The ADC device-ADC data server interface further includes operations such as reading a data class, setting attributes, and matching the ADC data grid. The "match grid" command requests that the ADC device handler determine if the input data matches the input grid. Both the structure and meaning of the data, and the structure and meaning of the grid are device dependent.

The ADC data server process interface includes an open function that opens a single data collection device channel and returns an ADC data server client handle that allows a client to access the ADC device. The open function creates a device client handle for the ADC device. The ADC protocol handler can retrieve a device's client handle. The ADC server process interface also allows the setting of specific ADC device attributes. Using an ADC data server client handle as input and the device attribute to be set, this function may be used for setting ADC device attributes such as enable/disable status; data grid (device independent and device dependent); read ahead/non-read ahead status; device client handle, and data class specification.

The ADC data server process interface also includes a read function that allows an ADC protocol handler to receive ADC data or device responses from an ADC device. The read function takes an ADC data server client handle and a data class mask indicating the classes of data to be retrieved. The structure of the data returned is device dependent. If the data class mask indicates that ADC data will be read, the read function initiates reading ADC data from the ADC device. The ADC data server 130 calls the ADC device handler's read function so that it can notify the ADC device that a client is ready to accept data.

The ADC device platform 100 utilizes the Simple Network Management Protocol ("SNMP") for network management. SNMP has recently become a well-favored network management protocol. SNMP utilizes a fetch-store paradigm in which agents and subagents maintain sets of management information such as statistics, status, and configuration values in a MIB, such as the MIBs contained in the MIB collection 823. The elements of an SNMP network management architecture typically comprise an SNMP manager, a managed system (e.g., the ADC device platform 100), a database of management information (e.g., a MIB), and a network protocol (e.g., TCP/IP). An exemplary SNMP network management architecture with regard to an embodiment of the ADC device platform 100 is further described in a provisional patent application entitled "Automatic Data Collection Device Having A Network Communications Capability," U.S. Provisional Application No. 60/084,272, filed on May 4, 1998, and assigned to a common assignee.

The SNMP master agent 829 controls the SNMP subagents in the SNMP subagent collection 824. The SNMP subagent collection 834 comprises an ADC data server SNMP subagent 827, an event log SNMP subagent 828, an ADC device SNMP subagent 825 (for the ADC device 117), and an ADC device SNMP subagent 826 (for the ADC device 118). The ADC device SNMP subagents 825, 826 respectively contain control information for the ADC devices 117, 118. The ADC device 117 and the ADC device 118 may each operate under different protocols and commands. For example, the ADC device platform 100 may be equipped with ADC devices as diverse as bar code readers and SmartCard readers. Since each ADC device typically operates under different protocols, each ADC device typically requires its own SNMP subagent. The SNMP subagent collection 834 may contain a respective ADC device SNMP subagent for each ADC device in the ADC device platform 100. Thus, the SNMP subagent collection 834 does not necessarily contain precisely two ADC device SNMP subagents. The event log SNMP subagent 828 allows the SNMP master agent 829 to retrieve the event log and set its filter. The event log SNMP subagent 828 also generates SNMP traps when specific events are received.

The SNMP master agent 829 performs SNMP packet verification on incoming and outgoing SNMP commands while a respective SNMP subagent (e.g., the ADC device SNMP subagent 225) in the SNMP subagent collection 824 performs the actual sending and retrieving of control information to/from a network element (e.g., the ADC device 117). For example, the ADC device SNMP subagents 825, 826 respectively translate between the communications protocol of ADC devices 117, 118 and the standardized SNMP protocol using information retrieved from the MIB collection 823. The SNMP master agent 829 operates with all SNMP compliant management software, according to an embodiment of the invention. The SNMP architecture provides flexibility to the ADC device platform 100 by allowing the SNMP subagents to be added and removed without effecting the other SNMP subagents or the MIB collection 823. Adding a new ADC device to the ADC device platform 100 requires only adding a new SNMP subagent and storing relevant information in the MIB collection 823, regardless of the new ADC device's communication protocol. The SNMP architecture also aids ADC device platform manufacturers and their value-added resellers ("VARs") by simplifying the addition of new ADC devices. The ADC data server 130 communicates with the SNMP subagent collection 834 through a DLL interface. The ADC device platform SNMP master agent 829 also communicates with the ADC data server, the network communication unit 221, and the computing system's operating system.

The MIB collection 823 describes or provides management information for SNMP devices, including the ADC data server 130 and the ADC devices 117, 118. For example, the MIB collection 823 includes a reader group MIB that provides ADC device configuration, reporting ADC device statistics, and running end device diagnostics. The MIB collection 823 describes a set of objects (such as the ADC devices 117, 118) to the SNMP subagents and provides information about each object, including its structure, its relationship to other objects, and the operations allowed on the object. The MIB collection 823 essentially tells the SNMP subagents what pieces of information they may modify or view on the ADC device platform 100. Configuration, control, and statistics data particular to the ADC device platform 100 are also described in the MIB collection 823. In addition to supporting the ADC device platform, the MIB collection 823 may include additional MIBs such as: a MIB-II ("RFC 1213"), an Intermec Reader MIB, an Intermec UDP+ MIB, Proxim Open-Air Radio MIB, a Scorpion 900 MHz Radio MIB, and a 802.11 MIB ("IEEE P802.11"), and other protocols, especially RF readable tag protocols, according to an embodiment of the invention.

The ADC data server 130 may also communicate with the Reader Command/SNMP Gateway 831 to provide reader commands for the ADC devices. A Reader command controls ADC devices, such as the ADC device 117, by sending commands for operations, such as turning laser scans on and off, changing reader configuration, and performing system management operations like backup and restore. The Reader Command/SNMP gateway 831 controls parsing/formatting and routing of reader commands. The Reader Command/SNMP gateway 831 is a DLL that converts legacy reader commands to SNMP requests, according to an embodiment of the invention. Reader commands can be received from bar code devices, 900 MHz devices, and local or remote clients. The Reader Command/SNMP gateway 831 parses these commands, translates them to an object identifier ("OID") for an appropriate ADC device and then routes the command through the ADC data server 130.

Using the Reader Command/SNMP gateway 831, a client application (e.g., the remote application 109) may transfer legacy system management commands through the Reader Command/SNMP command gateway 831 to an ADC device, such as the ADC device 117. If a client (e.g., the remote application 109) requests configuration data in reader command format, then the Reader Command/SNMP gateway 831 packages the configuration data in the reader command format. This architecture isolates all legacy reader command processing in a single place, simplifying maintenance of the ADC device platform 100.

Local applications, such as the local application 111, may utilize the ADC SDK 833 in the collection of ADC data. The SDK is a dynamic link library ("DLL") that allows ADC client applications to use legacy interfaces in communicating with ADC devices. Local applications may also utilize the ADC protocol handler collection 232, which may contain specialized DLLs for each ADC device configured to operate with the ADC device platform 100. DLLs allow executable routines to be stored separately as files having DLL extensions that are loaded only when needed by a program, such as by the local application 111. A DLL routine consumes no memory until it is used. Because a DLL routine is a separate file, a programmer may make connections or improvements to the routine without effecting the operation of the calling program or any other DLL routine. In addition, a programmer may use the same DLL routine with other programs. The DLL interface optimizes performance and resource overhead. The remote applications, such as the remote application 107, may also utilize the specialized DLLs provided by the ADC protocol handler collection 232.

The ADC SDK 833 provides the software elements that allow applications to access ADC device platform 100 elements such as the ADC data server 130. The ADC SDK 833 may be compatible with WindowsCE and Win32 programming environments. The ADC SDK 833 allows programmers to write seamless ADC device platform 100 applications in a Windows programming environment and debug the applications before executing then on the ADC device platform 100, according to an embodiment of the invention.

In one exemplary embodiment, the ADC SDK 833 supports programming elements, such as Visual C/C++, Microsoft Foundation Class ("MFC"), Visual Basic, and Java. The ADC SDK 833 includes Active X control/Java classes and ADC device platform legacy DLLs. The ADC device platform legacy DLLs provide legacy interfaces that tie together system elements. Both the Active X control/Java classes and the ADC device platform legacy DLL may operate in connection with value-added reseller ("VAR") applications. For example, the VAR applications may provide data collection and unit management applications. The Active X control/Java classes may communicate with a VAR application using Active X and Java APIs. The ADC device platform DLL communicates with the VAR applications through legacy APIs, such as a DLL interface.

The ADC device platform legacy DLLs use legacy reader commands to communicate with the Reader Command/SNMP gateway 831. The Reader Command/SNMP gateway 831 in turn uses legacy management commands or an SNMP interface to communicate with an ADC device platform SNMP that includes the SNMP master agent 829 and the SNMP subagent collection 824.

Figure 9:
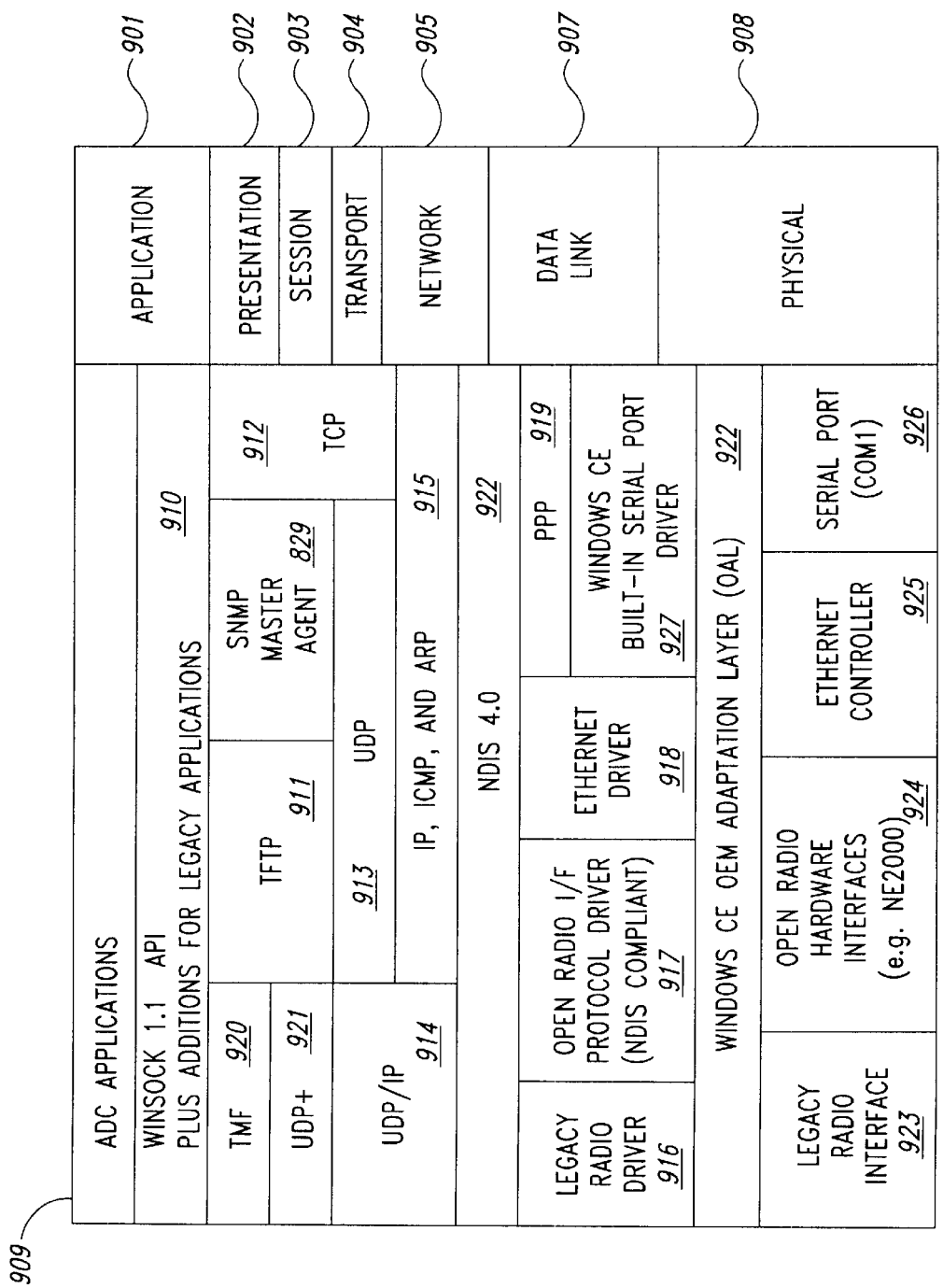
FIG. 9 illustrates an exemplary ADC device platform's communication stack.

FIG. 9 illustrates an exemplary ADC device platform's communication protocol stack. Data communications systems contain a communications stack for transferring data between computers such as between the ADC device platform 100 and the remote computing system 104. Each computer typically has a communications stack containing a number of layers. For example, the open systems interconnect ("OSI") communications stack defined by the International Standards Organization consists of seven layers. The layers form a sequence from a lowest layer ("or bottom layer") to the highest layer ("or top layer"). The layers divide the processing necessary for communicating between computers into discrete units. The bottom layer in the communications stack typically interacts with the physical medium used for transferring the data, such as coaxial cables. The top layer of the communications stack provides services to application programs, and the middle layers of the communications stack typically are responsible for routing and maintaining a connection. A local computer transfers data to a remote computer when an application program first passes the data to the top layer of the communications stack of the local computer. The top layer then processes the data and sends the data to the next lowest layer in the communications stack. Thereafter, each layer in turn processes the data until the data reaches the bottom layer, where the data is sent to the remote computer over the transfer medium. The bottom layer of the communications stack of the remote computer receives the data from the transfer medium and passes the data up the communications stack. Each layer performs its specific processing on the data until the data reaches the top layer. The top layer processes the data and sends the data to an application program. A comstack manager typically starts the communication stack and maintains its stack during its lifetime.

In one exemplary embodiment, the communication stack of the ADC device platform 100 utilizes a seven-layered communication protocol, including an application layer 901, a presentation layer 902, a session layer 903, a transport layer 904, a network layer 905, a data link layer 907 and a physical layer 908. Included in the application layers 901 are ADC device platform applications 909 and the Winsock 1.1 API plus additions for legacy applications 910. The presentation layer 902 and session layer 903 may include the Terminal Message Format ("TMF") protocol 920 and UDP+ protocols 921, the Trivial File Transfer Protocol ("TFTP") protocol 911 and the SNMP master agent 829. The TCP protocol 912 is included in the application layer 901, the presentation layer 902, the session layer 903, the transport layer 904, and the network layer 905. The UDP layer 913 resides primarily in the transport layer 904. IP, ICMP, and ARP 915 reside within the network layer 905. IP refers to the well-known Internet Protocol. The Internet Control Message Protocol ("ICMP") provides diagnostic functions and can send error packets to hosts regarding message transmission. The Address Resolution Protocol ("ARP") is a low-level protocol utilized by TCP/IP that obtains a physical address when only a logical address is known. UDP/IP 914 combines UDP with IP and provides communications spanning from the session layer 903. to the transport layer 904.

Network Driver Interface Specification ("NDIS") Version 4.0 922, provides hardware and protocol independence for network drivers utilized by the ADC device platform 100. NDIS, of which version 4.0 may be used, offers a device driver standard that allows for running multiple protocols on the same network adapter.

Legacy radio driver 916 refers to pre-existing radio driver protocols that may be utilized within the ADC device platform 100. Open Radio Interface 917 provides radio driver interfaces that are customizable across radio devices. An Ethernet driver 918 enables Ethernet communications for the ADC device platform 100. The Ethernet provides a local area network ("LAN") that connects computing elements together within the same building or campus. The Ethernet is a physical link and data link protocol, reflecting the two lowest layers of the OSI model. Point-to-Point Protocol ("PPP") 919 is a data link protocol that provides a well-known method for transmitting IP frames over a circuit. The PPP 927 may communicate with a WindowsCE built-in serial port driver 927 that further processes communications into the physical layer 908.

A WindowsCE Original Equipment Manufacturer ("OEM") Adaptation Layer ("OAL") 922 represents a service provided by the WindowsCE operating system for the ADC device platform 100 that translates communications into a format required by a given OEM device. Many low-level hardware components on the ADC device platform 100 may be provided by various OEMs, and the WindowsCE operating system provides a method for communicating to the various OEM devices.

Legacy radio interface 923 provides a match at the physical layer 908 for the legacy radio driver 916. Similarly, Open Radio Hardware Interfaces 924 provides a match at the physical layer 908 for the Open Radio Interface Protocol Driver 917. Ethernet controller 925 matches with the Ethernet Driver 918, and Serial Port (COM1) 926 matches with the WindowsCE built-in serial driver 927.

The invention may operate in conjunction with a virtual wedge, a mechanism for intelligently routing data, a system for simultaneously outputting data to different clients, and a system for receiving data output instructions. An Exemplary virtual wedge is described in U.S. application Ser. No. 09239,558 entitled "Automatic Data Collection ("ADC") That Includes A Virtual Wedge That Routes ADC Data To Application Programs," filed on Jan. 29, 1999 and assigned to a common assignee. An exemplary mechanism for intelligently routing data is described in U.S. application Ser. No. 09/240,194, entitled "Automatic Data Collection Device That Intelligently Switches Data Based On Data Type" filed on and assigned to a common assignee. An exemplary system for simultaneously outputting data to different applications and a system for receiving output data instruction is described in U.S. application Ser. No. 09/240,303, entitled "Automatic Data Collection ("ADC") Device That Receives Data Output Instructions From Data Consumers," filed on Jan. 29, 1999, and assigned to a common assignee.

The ADC device platform 102 may be applied in connection with systems and methods for more accurate bar code scanning. Exemplary systems are more clearly described in a patent application entitled "Method for Decoding Bar Code Symbols by Declaring Erasures of Element Widths Based on Soft Decision of Measured Widths," U.S. application Ser. No. 09/007,277, filed on Jan. 14, 1998, and U.S. Pat. Nos. 5,676,473, 5,777,309, 5,539,191, 5,514,858, and 5,553,084, all assigned to a common assignee.

The ADC device platform 100 may also be applied in conjunction with improved scanning devices and procedures. One applicable approach is more clearly described in a patent application entitled "Method of Autodiscriminating in Symbology Reader Employing Prioritized and Updated Table of Symbologies," U.S. application Ser. No. 09/006,693, filed on Jan. 14, 1998, and assigned to a common assignee.

Aspects of the invention provide a system and method for controlling several ADC device platforms. The invention is particularly applicable to instrumented ADC device platforms, including hand-held devices, but is also applicable to other computing systems as well. Under aspects of the invention, a remote computing system having browsing software receives Hypertext Markup Language ("HTML") documents, Dynamic Hypertext MarkUp Language ("DHTML") documents, Extensible Mark-Up Language ("XML") documents, and/or other documents containing ADC device computing applications over the World Wide Web. The remote computing system, such as the remote computing system 104, uses these ADC device computing applications to communicate with a network of ADC platform devices. The SNMP master agent 829 communicates with the remote computing system 104, and a translator translates SNMP-formatted data sent to the ADC device platform 100 into a format suitable for reception by its ADC devices. Another translator translates data received from the ADC device into the SNMP format for transmission to the remote computing system. The SNMP master agent communicates with the remote computing system using the TCP, UDP/IP, or UDP+ protocols. While the SNMP protocol specifies that it uses UDP, a variant of the SNMP protocol may be used with TCP. The ADC platform device may also utilize a wireless communications system for all or a portion of its communications with the remote computing system. Embodiments of the invention provide a data communications network that uses Internet technology to deliver data from ADC devices to local and remote applications.

The ADC device network is scaleable from a minimal system having a few ADC device platforms to a large system with hundreds of ADC device platforms connected in a network. The minimal system requires only a low-cost personal computer ("PC") based web browser, while the larger system may utilize an existing communications infrastructure having a mixture of ADC devices.

According to one embodiment of the invention, the data communications network may use Java applets as the user interface to communicate data requests, including directions to the ADC data grid, to ADC device platforms. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web. A Java applet may be loaded and run by an already running Java application, such as a web browser. Java applets may be downloaded and run by any web browser capable of interpreting Java, such as Microsoft Internet Explorer, Netscape Navigator, and Hot Java.

Although specific embodiments of, and examples for, the invention are described herein for illustrative purposes, various equivalent modifications are possible within the scope of the invention, as will be recognized by those skilled in the relevant art. The teachings provided herein of the invention can be applied to other data symbol imaging systems, not necessarily the exemplary ADC device platform having ADC devices described above. Various exemplary data symbol enablement systems, and accordingly, various other device input and output enablement systems can be employed under the invention. While the invention discusses bar code symbologies, the invention can similarly read visual indicia of other stored images. The ADC device platform may operate with protocols and languages in addition to those specifically disclosed herein. For example, the ADC device platform is not limited to operations using HTTP, HTML, DHTML, XML, UDP, TCP/IP, FTP, SNMP, and TFTP but is equally applicable to other similar languages and protocols. Similarly, applications used within the ADC device platform, such as the ADC data server, may be developed using an object oriented programming methodology or using any other programming methodology that results in a computing system having equivalent functionality.

Aspects of the invention can be applied to not only reading machine-readable symbols and other images, but also to transmitting such images to external devices, such as computerized servers and printers. The embodiments of the invention disclosed hereinabove have been discussed primarily with regard to hand-hand devices, such as hand-held data collection terminals. However, the invention finds equal applicability in stationary data collection terminals, such as a permanently mounted device, and in desktop personal computers.

All of the above U.S. patents and applications are incorporated by reference.

These and other changes can be made to the invention in light of the above detailed description. In general, in the following claims, the terms used should not be construed to limit the invention to the specific embodiments disclosed in the specification and the claims, but should be construed to include all ADC device platforms, data collection terminals, and data symbol imaging systems that operate under the claims set forth hereinbelow. Accordingly, the invention is not limited by the disclosure, but instead its scope is to be determined entirely by the following claims.

What is claimed is:

1. A method for routing data sets, comprising:
receiving at least one directive for at least one automatic data collection ("ADC") device of a plurality of ADC devices from at least one client application of a plurality of client applications, wherein the at least one directive contains at least one condition under which a data set received from the at least one ADC device will be routed to the at least one client application;
storing the at least one directive in a dynamic wedge grid;
receiving an ADC data set having characteristics from the at least one ADC device;
identifying the characteristics of the ADC data set; and
comparing the characteristics of the ADC data set against the at least one condition of the directive for the at least one ADC device stored in the dynamic wedge grid to determine if the ADC data set will be routed to the at least one client application, wherein the data set is received by an ADC data server in an ADC device platform that also contains the at least one ADC device, wherein the ADC data server performs the comparison of the ADC data set against the at least one condition of the directive stored in the dynamic wedge grid.

2. The method of claim 1, further comprising routing the ADC data set to the at least one client application if the directive indicates that the ADC data set should be routed to the at least one client application.

3. The method of claim 1 wherein a characteristic of the ADC data set characteristics is a data type characteristic that comprises one of bar code data, radio frequency ("RF") tag data, resonator data, SmartCard data, magnetic stripe data, optical character recognition ("OCR") data, text data, ASCII data, ECI data, two-dimensional data, dipole device data, and speech input data.

4. A method for routing data sets, comprising:
receiving at least one directive for at least one automatic data collection ("ADC") device of a plurality of ADC devices from at least one client application of a plurality of client applications, wherein the at least one directive contains at least one condition under which a data set received from the at least one ADC device will be routed to the at least one client application;
storing the at least one directive in a dynamic wedge grid;
receiving an ADC data set having characteristics from the at least one ADC device;
identifying the characteristics of the ADC data set; and
comparing the characteristics of the ADC data set against the at least one condition of the directive for the at least one ADC device stored in the dynamic wedge grid to determine if the ADC data set will be routed to the at least one client application, wherein a characteristic of the ADC data set characteristics is a data type characteristic that comprises one of bar code data, radio frequency ("RF") tag data, resonator data, SmartCard data, magnetic stripe data, optical character recognition ("OCR") data, text data, ASCII data, ECI data, two-dimensional data, dipole device data, and speech input data and wherein the at least one condition in the at least one directive states that the ADC data set will be routed to the at least one client application based upon the data type characteristic of the data set and upon another characteristic of the ADC data set characteristics.

5. The method of claim 4 wherein the at least one ADC device is one of a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

6. The method of claim 1 wherein the characteristics of the ADC data set characteristics comprise at least one of a data set size, a data set value range, a number of data elements in the data set, and a data quality description.

7. The method of claim 1 wherein the at least one condition of the directive comprises at least one of a data set size, a data set value range, a number of data elements in the data set, and a data quality description.

8. The method of claim 1 wherein identifying the characteristics of the ADC data set is performed when the received ADC data set from the least one ADC device does not include a client handle that identifies the a client application of the plurality of client applications.

9. The method of claim 1, further comprising:
receiving a data reading instruction from the at least one client application for the at least one ADC device;
sending the data reading instruction to the at least one ADC device; and
reading the data reading instruction by the at least one ADC device that sends the ADC data set having characteristics to a data processor that identifies the characteristics of the data set.

10. A method for routing data sets, comprising:
receiving at least one directive for at least one automatic data collection ("ADC") device of a plurality of ADC devices from at least one client application of a plurality of client applications, wherein the at least one directive contains at least one condition under which a data set received from the at least one ADC device will be routed to the at least one client application;

storing the at least one directive in a dynamic wedge grid;

receiving an ADC data set having characteristics from the at least one ADC device;

identifying the characteristics of the ADC data set;

comparing the characteristics of the ADC data set against the at least one condition of the directive for the at least one ADC device stored in the dynamic wedge grid to determine if the ADC data set will be routed to the at least one client application;

receiving a data reading instruction from the at least one client application for the at least one ADC device;

sending the data reading instruction to the at least one ADC device; and reading the data reading instruction by the at least one ADC device that sends the ADC data set having characteristics to an ADC data server that identifies the characteristics of the data set, receives the data reading instruction from the at least one client application, and directs the translation of the data reading instruction into a native format of the at least one ADC device.

11. A method for routing data sets, comprising:

receiving at least one directive for at least one automatic data collection ("ADC") device of a plurality of ADC devices from at least one client application of a plurality of client applications, wherein the at least one directive contains at least one condition under which a data set received from the at least one ADC device will be routed to the at least one client application;

storing the at least one directive in a dynamic wedge grid;

receiving an ADC data set having characteristics from the at least one ADC device;

identifying the characteristics of the ADC data set;

comparing the characteristics of the ADC data set against the at least one condition of the directive for the at least one ADC device stored in the dynamic wedge grid to determine if the ADC data set will be routed to the at least one client application;

receiving a data reading instruction from the at least one client application for the at least one ADC device;

sending the data reading instruction to the at least one ADC device; and reading the data reading instruction by the at least one ADC device that sends the ADC data set having characteristics to a data processor that identifies the characteristics of the data set, wherein the data processor is an ADC data server that receives the data reading instruction from the at least one client application and directs a protocol handler and a device handler to translate the data reading instruction into a native format of the at least one ADC device.

12. The method of claim 1, further comprising:

receiving at least another directive containing at least another condition for the at least one ADC device of the plurality of ADC devices from at least another client application of the plurality of client applications;

storing the at least another directive in the dynamic wedge grid; and comparing the characteristics of the ADC data set against the at least one condition of the at least another directive for the at least one ADC device stored in the dynamic wedge grid to determine if the ADC data set will be routed to the at least another client application.

13. The method of claim 1, further comprising:

receiving at least another directive containing at least another condition for the at least one ADC device of the plurality of ADC devices from at least another client application of the plurality of client applications;

storing the at least another directive in the dynamic wedge grid; and comparing the characteristics of the ADC data set against the at least one condition of the at least another directive for the at least one ADC device stored in the dynamic wedge grid to determine if the ADC data set will be routed to the at least another client application, wherein the at least one client application resides in an ADC device platform that contains the at least one ADC device and the at least another client application resides on a remote computing system.

14. The method of claim 1 wherein the at least one client application resides on a remote computing system and wherein the ADC device communicates with the remote computing system using one of the Transmission Control Protocol ("TCP"), the User Datagram Protocol ("UDP"), and the User Datagram Protocol Plus ("UDP+").

15. The method of claim 1 wherein the at least one client application resides on a remote computing system and wherein communications between the at least one client application and the ADC device platform pass over at least one of an intranet, an internet, a local area network, a wide area network, or the World Wide Web.

16. The method of claim 1, further comprising:

receiving at least another directive containing at least another condition for the at least one ADC device of the plurality of ADC devices from at least another client application of the plurality of client applications;

storing the at least another directive in the dynamic wedge grid; and comparing the characteristics of the ADC data set against the at least one condition of the at least another directive for the at least one ADC device stored in the dynamic wedge grid to determine if the ADC data set will be routed to the at least another client application, wherein the at least one ADC device resides in an ADC device platform, the at least one client application resides in a remote computing system, and the at least another client application resides in another remote computing system.

17. The method of claim 1, further comprising:

receiving at least another directive containing at least another condition for at least another ADC device of the plurality of ADC devices from the at least one client application of the plurality of client applications;

storing the at least another data directive in another dynamic wedge grid;

receiving another ADC data set having characteristics from the at least another ADC device;

identifying the characteristics of the another ADC data set; and comparing the characteristics of the another ADC data set against the at least another condition of the at least another directive for the at least another ADC device stored in the another dynamic wedge grid to determine if the another ADC data set will be routed to the at least one client application.

18. The method of claim 1, further comprising:
   receiving at least another directive containing at least another condition for at least another ADC device of the plurality of ADC devices from the at least one client application of the plurality of client applications;
   storing the at least another data directive in another dynamic wedge grid;
   receiving another ADC data set having characteristics from the at least another ADC device;
   identifying the characteristics of the another ADC data set; and
   comparing the characteristics of the another ADC data set against the at least another condition of the at least another directive for the at least another ADC device stored in the another dynamic wedge grid to determine if the another ADC data set will be routed to the at least one client application, wherein the dynamic wedge grid and the another dynamic wedge grid share a common structure in a memory element.

19. A system for routing a plurality of data sets, comprising:
   an automatic data collection ("ADC") data server that receives the plurality of data sets having data characteristics from a plurality of ADC devices and examines each data set of the plurality of data sets to determine the data characteristics of the data set;
   a dynamic wedge grid that contains at least one directive for at least one ADC device of the plurality of ADC devices and at least one client application of a plurality of client applications, wherein the at least one directive contains at least one condition under which a data set received from the at least one ADC device will be routed to the at least one client application; and
   a wedge interrogator that receives the data characteristics of the data set and examines the dynamic wedge grid to determine if the data characteristics of the data set match the at least one condition of the at least one directive.

20. The system of claim 19, further comprising a data router that routes each data set of the plurality of data sets to at least one identified client application of the plurality of client applications when the wedge interrogator has identified a match between the data characteristics of the data set and the at least one condition of the at least one directive.

21. The system of claim 19 wherein the dynamic wedge grid further comprises a data routing instruction for the data set based upon the ADC device that provided the data set and the identified characteristics of the data set.

22. The system of claim 19 where in the ADC data server resides in an ADC device platform that contains the plurality of ADC devices.

23. The system of claim 19 wherein the wedge interrogator resides within the ADC data server.

24. The system of claim 19 wherein each data set of the plurality of data sets comprises one of bar code data, radio frequency ("RF") tag data, resonator data, SmartCard data, magnetic stripe data, optical character recognition ("OCR") data, text data, two-dimensional data, dipole device data, and speech input data.

25. The system of claim 19 wherein at least one ADC device of the plurality of ADC devices is one of a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

26. The system of claim 19 wherein the characteristics of the data set of the plurality of data sets includes at least one of a data set size, a data set value range, a number of data elements in the data set, and a data quality description.

27. The system of claim 19, further comprising:
   an instruction receiver in the ADC device platform that receives a data reading instruction from at least one client of the plurality of clients for the at least one ADC device of the plurality of ADC devices;
   an ADC device handler that receives the data reading instruction from the instruction receiver and translates the data reading into a native format for the at least one ADC device; and
   a data reading instruction router that routes the translated data reading instruction in the native format to the at least one ADC device that performs a data read after receiving the translated data reading instruction and routes the data set to the ADC data server.

28. The system of claim 1, further comprising:
   an instruction receiver in the ADC device platform that receives a data reading instruction from at least one client of the plurality of clients for the at least one ADC device of the plurality of ADC devices;
   an ADC device handler that receives the data reading instruction from the instruction receiver and translates the data reading into a native format for the at least one ADC device;
   a data reading instruction router that routes the translated data reading instruction in the native format to the at least one ADC device that performs a data read after receiving the translated data reading instruction and routes the data set to the ADC data server; and
   an ADC protocol handler that translates device-specific portions of the data reading instruction into a native format of the at least one ADC device for transmission by the data reading instruction router.

29. The system of claim 1 wherein the wedge interrogator identifies more than one client application of the plurality of client applications to receive the data set based upon examination of the dynamic wedge grid.

30. The system of claim 1 wherein the at least one client application resides on a remote computing system.

31. The system of claim 1 wherein the at least one client application resides on a remote computing system and the ADC device platform communicates with the remote computing system using one of the Transmission Control Protocol ("TCP"), the User Datagram Protocol ("UDP"), and the User Datagram Protocol Plus ("UDP+").

32. The system of claim 1 wherein the at least one client application resides on a remote computing system and communications between at least one client application of the plurality of client applications and the ADC device platform pass over at least one of an intranet, an internet, a local area network, a wide area network, and the World Wide Web.

33. The system of claim 1 wherein the ADC data server, the plurality of ADC devices reside, and the at least one client application of the plurality of client applications reside in the ADC device platform.

34. An automatic data collection ("ADC") network that routes data, comprising:
   a plurality of ADC device platforms, such that at least one ADC device platform comprises:
      at least one ADC device;
      an ADC data server that receives a plurality of data sets having characteristics from the at least one ADC device;

a dynamic wedge grid that contains at least one directive for the at least one ADC device and at least one client application of a plurality of client applications, wherein the at least one directive contains at least one condition under which a data set of the plurality of data sets received from the at least one ADC device will be routed to the at least one client application; and a dynamic wedge interrogator that identifies the data characteristics of each data set of the plurality of data sets and compares the identified data characteristics of each received data set against the directives in the dynamic wedge grid to determine if one or more client applications of plurality of client applications should receive a data set of the plurality of data sets.

35. The system of claim 34, wherein the at least one ADC device platform further comprises a data router that routes each data set of the plurality of data sets to client applications identified by the dynamic wedge interrogator.

36. The system of claim 34 wherein the dynamic wedge grid further comprises a directive for a client application based upon the ADC device that provided the data set and the identified characteristics of the data set.

37. The system of claim 34 wherein each data set of the plurality of data sets comprises one of bar code data, radio frequency ("RF") tag data, resonator data, SmartCard data, magnetic stripe data, optical character recognition ("OCR") data, text data, ASCII data, ECI data, two-dimensional data, dipole device data, and speech input data.

38. The system of claim 34 wherein the at least one ADC device is one of a bar code reader, a radio frequency ("RF") tag reader, a resonator reader, a SmartCard reader, a magnetic stripe reader, an optical character recognition ("OCR") reader, a two-dimensional data reader, a dipole device reader, and a speech input recognizing device.

39. The system of claim 34 wherein the characteristics of the data set includes at least one of a data set size, a data set value range, a number of data elements in the data set, and a data class specification.

40. The system of claim 34 wherein the at least one ADC device platform further comprises:

an instruction receiver that receives a data reading instruction from the at least one client application;

an ADC device handler that receives the data reading instruction from the instruction receiver and translates instructions for the at least one ADC device into a native format for the at least one ADC device; and a data reading instruction router that routes instructions in the native format to the at least one ADC device that performs a data read and returns the data set to the ADC data server.

41. The system of claim 34, further comprising:

an instruction receiver that receives a data reading instruction from the at least one client application;

an ADC device handler that receives the data reading instruction from the instruction receiver and translates instructions for the at least one ADC device into a native format for the at least one ADC device;

a data reading instruction router that routes instructions in the native format to the at least one ADC device that performs a data read and returns the data set to the ADC data server; and an ADC protocol handler that translates device-specific portions of the data reading instruction into a native formation of the at least one ADC device for transmission by the data reading instruction router.

42. The system of claim 34 wherein the dynamic wedge interrogator identifies more than one client application of the plurality of client applications to receive the data set based upon examination of the dynamic wedge grid.

43. The system of claim 34 wherein the at least one client application resides in the at least one ADC device platform and at least another client application resides on a remote computing system.

44. The system of claim 34 wherein the at least one ADC device platform communicates with a remote computing system using one of the Transmission Control Protocol ("TCP"), the User Datagram Protocol ("UDP"), and the User Datagram Protocol Plus ("UDP+").

45. The system of claim 34 wherein communications between the at least one client application and the at least one ADC device platform pass over at least one of an intranet, an internet, a local area network, a wide area network, and the World Wide Web.

* * * * *

UNITED STATES PATENT AND TRADEMARK OFFICE
CERTIFICATE OF CORRECTION

PATENT NO. : 6,488,209 B1
DATED : December 3, 2002
INVENTOR(S) : Jeffrey M. Hunt et al.

It is certified that error appears in the above-identified patent and that said Letters Patent is hereby corrected as shown below:

Column 26,
Line 19, "The system of claim 1, further comprising" should be corrected to read -- The system of claim 19, further comprising --
Lines 37, 41, 43, 49 and 56, "The system of claim 1 wherein" should be corrected to read -- The system of claim 19 wherein --

Signed and Sealed this

Thirteenth Day of May, 2003

JAMES E. ROGAN
*Director of the United States Patent and Trademark Office*